United States Patent
Aoki et al.

(10) Patent No.: US 10,686,985 B2
(45) Date of Patent: Jun. 16, 2020

(54) MOVING PICTURE REPRODUCING DEVICE, MOVING PICTURE REPRODUCING METHOD, MOVING PICTURE REPRODUCING PROGRAM, MOVING PICTURE REPRODUCING SYSTEM, AND MOVING PICTURE TRANSMISSION DEVICE

(71) Applicant: Kadinche Corporation, Shinagawa-ku, Tokyo (JP)

(72) Inventors: Soko Aoki, Tokyo (JP); Kazutaka Uchida, Tokyo (JP); Shun Fukumoto, Tokyo (JP)

(73) Assignee: KADINCHE CORPORATION, Tokyo (JP)

( * ) Notice: Subject to any disclaimer, the term of this patent is extended or adjusted under 35 U.S.C. 154(b) by 0 days.

(21) Appl. No.: 15/737,720

(22) PCT Filed: Jul. 28, 2016

(86) PCT No.: PCT/JP2016/072228
§ 371 (c)(1),
(2) Date: Dec. 18, 2017

(87) PCT Pub. No.: WO2017/022641
PCT Pub. Date: Feb. 9, 2017

(65) Prior Publication Data
US 2018/0191955 A1 Jul. 5, 2018

(30) Foreign Application Priority Data

Jul. 31, 2015 (JP) .................................. 2015-152269

(51) Int. Cl.
*H04N 5/232* (2006.01)
*H04N 5/91* (2006.01)
(Continued)

(52) U.S. Cl.
CPC ....... *H04N 5/23238* (2013.01); *G11B 27/031* (2013.01); *G11B 27/102* (2013.01);
(Continued)

(58) Field of Classification Search
CPC ................ G11B 27/031; G11B 27/102; H04N 5/23238; H04N 5/23206; H04N 5/23216;
(Continued)

(56) References Cited

U.S. PATENT DOCUMENTS

2006/0195475 A1* 8/2006 Logan ..................... G06F 16/58
2006/0288375 A1 12/2006 Ortiz et al.
(Continued)

FOREIGN PATENT DOCUMENTS

JP H10191261 A 7/1998
JP 2012-142860 7/2012
(Continued)

OTHER PUBLICATIONS

International Search Report received in PCT Application No. PCT/JP2016/072228 dated Oct. 18, 2016.
(Continued)

*Primary Examiner* — Thai Q Tran
*Assistant Examiner* — Sunghyoun Park
(74) *Attorney, Agent, or Firm* — Knobbe, Martens, Olson & Bear LLP

(57) ABSTRACT

In order to improve entertainment of panoramic images, a moving picture reproducing device includes: a storing means configured to store a plurality of panoramic image data photographed at an identical time by associating with predetermined time information; a reproduction control means configured to set selected one of the plurality of panoramic image data as a reproduction target, set a clipped part of the reproduction target as a presentation image, and display the presentation image on a display device; and a
(Continued)

switching control means configured to, when the reproduction target is reproduced at a predetermined reproduction timing, switch the reproduction target to another panoramic image data at the reproduction timing on the basis of the time information in response to a user's switching request.

5 Claims, 26 Drawing Sheets

(51) Int. Cl.

| | | |
|---|---|---|
| *H04N 5/77* | (2006.01) | |
| *H04N 21/4728* | (2011.01) | |
| *H04N 21/218* | (2011.01) | |
| *H04N 21/6587* | (2011.01) | |
| *H04N 21/4223* | (2011.01) | |
| *H04N 21/81* | (2011.01) | |
| *H04N 21/8547* | (2011.01) | |
| *G11B 27/031* | (2006.01) | |
| *G11B 27/10* | (2006.01) | |
| *H04N 5/935* | (2006.01) | |

(52) U.S. Cl.
CPC ..... *H04N 5/23206* (2013.01); *H04N 5/23216* (2013.01); *H04N 5/23293* (2013.01); *H04N 5/77* (2013.01); *H04N 5/91* (2013.01); *H04N 5/935* (2013.01); *H04N 21/21805* (2013.01); *H04N 21/4223* (2013.01); *H04N 21/4728* (2013.01); *H04N 21/6587* (2013.01); *H04N 21/816* (2013.01); *H04N 21/8547* (2013.01)

(58) Field of Classification Search
CPC ........ H04N 5/23293; H04N 5/77; H04N 5/91; H04N 5/935; H04N 21/21805; H04N 21/4223; H04N 21/4728; H04N 21/6587; H04N 21/816; H04N 21/8547
See application file for complete search history.

(56) References Cited

U.S. PATENT DOCUMENTS

| | | | | |
|---|---|---|---|---|
| 2007/0103565 A1* | 5/2007 | Xu | ........................ | G06F 16/50 348/231.2 |
| 2008/0244066 A1* | 10/2008 | Yoshida | ................ | G03B 15/08 709/224 |
| 2009/0087161 A1* | 4/2009 | Roberts | ................ | G11B 27/031 386/282 |
| 2010/0111429 A1* | 5/2010 | Wang | .................... | G06T 3/4038 382/233 |
| 2011/0173565 A1* | 7/2011 | Ofek | ..................... | G09B 29/00 715/790 |
| 2012/0257083 A1* | 10/2012 | Komiyama | .......... | G11B 27/105 348/231.5 |
| 2013/0202265 A1 | 8/2013 | Arrasvuori et al. | | |
| 2013/0322845 A1 | 12/2013 | Suzuki et al. | | |
| 2014/0118509 A1* | 5/2014 | Kroon | ................. | H04N 13/117 348/51 |
| 2014/0245367 A1 | 8/2014 | Sasaki et al. | | |
| 2014/0282192 A1* | 9/2014 | Grossman | ............. | G06F 16/285 715/771 |

FOREIGN PATENT DOCUMENTS

| | | |
|---|---|---|
| JP | 2013-183209 | 9/2013 |
| JP | 2013-250829 | 12/2013 |

OTHER PUBLICATIONS

Supplementary European Search Report received in European Application No. 16832920.9 dated Jul. 9, 2018.

* cited by examiner

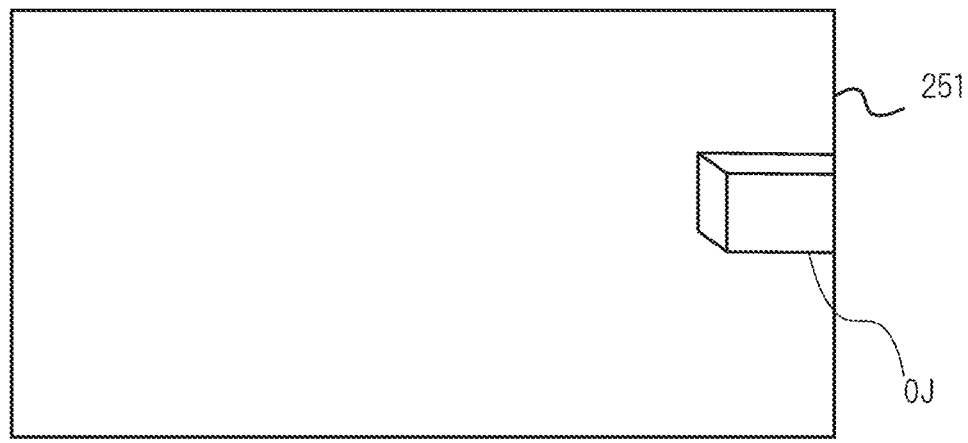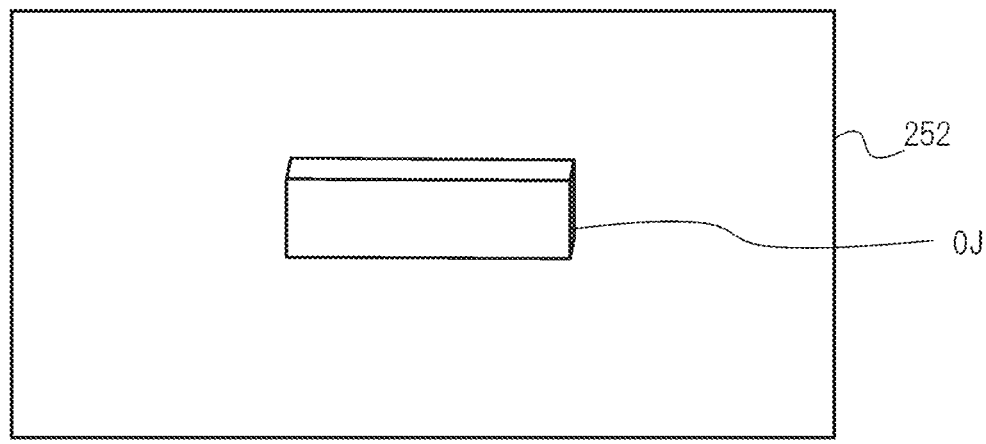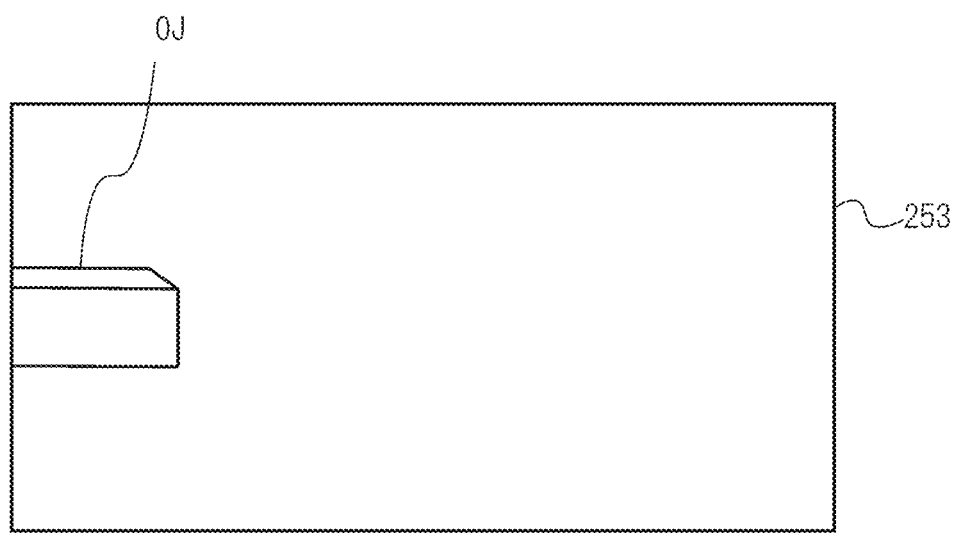
FIG.22

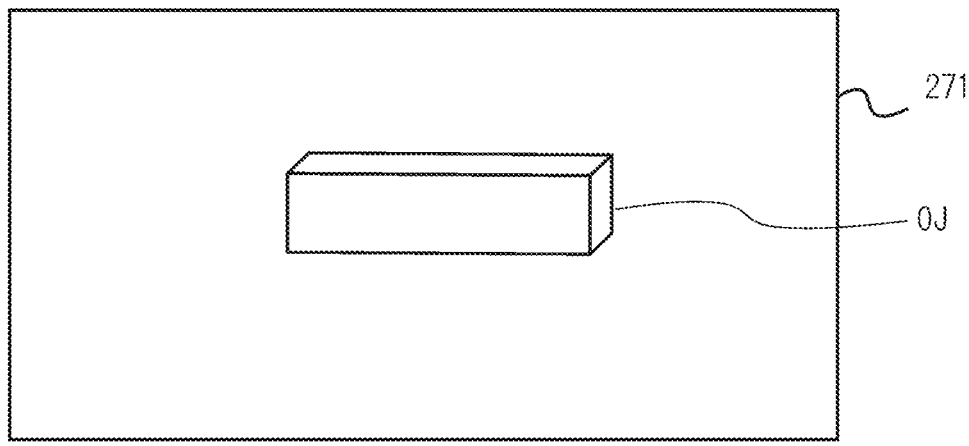
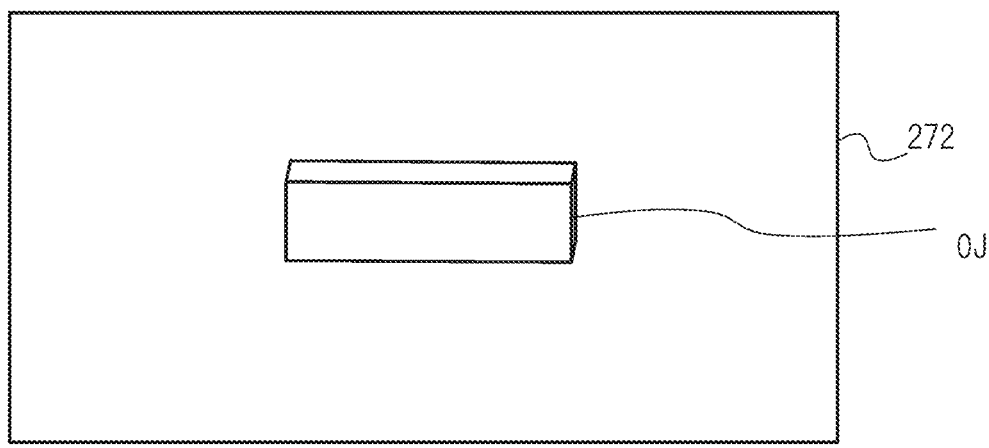
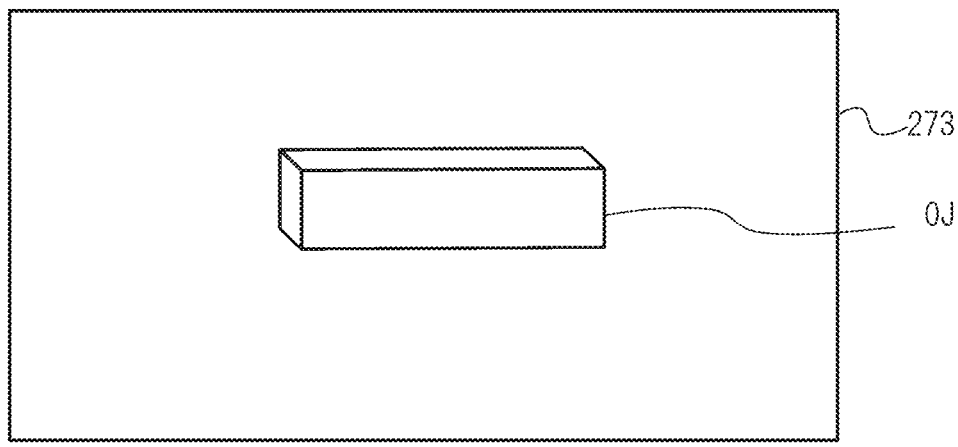
FIG.25

MOVING PICTURE REPRODUCING DEVICE, MOVING PICTURE REPRODUCING METHOD, MOVING PICTURE REPRODUCING PROGRAM, MOVING PICTURE REPRODUCING SYSTEM, AND MOVING PICTURE TRANSMISSION DEVICE

CROSS-REFERENCE TO RELATED APPLICATION

This application is a U.S. National Phase Application under 35 U.S.C. 371 of International Application No. PCT/JP2016/072228 filed on Jul. 28, 2016 and published as WO 2017/022641 A1 on Feb. 9, 2017. This application is based on and claims the benefit of priority from JP Application No. 2015-152269, filed Jul. 31, 2015. The entire disclosures of all of the above applications are incorporated herein by reference.

FIELD

The present invention relates to a moving picture reproducing device, a moving picture reproducing method, and a moving picture reproducing program, particularly, suitable for reproducing a wide angle-of-view image.

BACKGROUND

In the related art, a wide angle-of-view image is called a panoramic image and is employed in a wide variety of applications such as a monitoring camera or a teleconference. Some panoramic images are photographed at an angle of view of 360°, and they are called full-sphere panorama or half sphere panorama.

In such a panoramic image having an ultra wide angle of view, it is difficult to display it at once such that it can be naturally felt by human eyes. Therefore, a photographed panoramic image is clipped to match a user's viewpoint, and this portion of the image is then displayed on a display device.

CITATION LIST

Patent Documents

Patent Document 1: JP 2014-165763 A

SUMMARY

However, there has been a demand for improvement of entertainment in such panoramic images.

In view of such a problem, it is therefore an object of the present disclosure to provide a moving picture reproducing device, a moving picture reproducing method, a moving picture reproducing program, a moving picture reproducing system, and a moving picture transmission device capable of improving entertainment.

In order to achieve such an object, according to an aspect of the invention, there is provided a moving picture reproducing device including: an storing means configured to store a plurality of panoramic image data photographed at an identical time by associating with predetermined time information; a reproduction control means configured to set selected one of the plurality of panoramic image data as a reproduction target, set a clipped part of the reproduction target as a presentation image, and display the presentation image on a display device; and a switching control means configured to, when the reproduction target is reproduced at a predetermined reproduction timing, switch the reproduction target to another panoramic image data at the reproduction timing on the basis of the time information in response to a user's switching request.

As a result, it is possible to entertain the viewing user and improve entertainment of the panoramic image data by switching a plurality of panoramic image data photographed at an identical time without discomfort.

According to another aspect of the invention, there is provided a moving picture reproducing system including: a storing means configured to store a plurality of panoramic image data photographed at an identical time by associating with predetermined time information; a reproduction control means configured to set selected one of the plurality of panoramic image data as a reproduction target, set a clipped part of the reproduction target as a presentation image, and display the presentation image on a display device; and a switching control means configured to, when the reproduction target is reproduced at a predetermined reproduction timing, switch the reproduction target to another panoramic image data at the reproduction timing on the basis of the time information in response to a user's switching request.

As a result, it is possible to entertain the viewing user and improve entertainment of the panoramic image data by switching a plurality of panoramic image data photographed at an identical time without discomfort.

According to further another aspect of the invention, there is provided a moving picture reproducing method including: a storing step of storing a plurality of panoramic image data photographed at an identical time by associating with predetermined time information; a reproduction control step of setting selected one of the plurality of panoramic image data as a reproduction target, setting a clipped part of the reproduction target as a presentation image, and displaying the presentation image on a display device; and a switching control step of, when the reproduction target is reproduced at a predetermined reproduction timing, switching the reproduction target to another panoramic image data at the reproduction timing on the basis of the time information in response to a user's switching request.

As a result, it is possible to entertain the viewing user and improve entertainment of the panoramic image data by switching a plurality of panoramic image data photographed at an identical time without discomfort.

According to still another aspect of the invention, there is provided a moving picture reproducing program including: a storing step of storing a plurality of panoramic image data photographed at an identical time by associating with predetermined time information; a reproduction control step of setting selected one of the plurality of panoramic image data as a reproduction target, setting a clipped part of the reproduction target as a presentation image, and displaying the presentation image on a display device; and a switching control step of, when the reproduction target is reproduced at a predetermined reproduction timing, switching the reproduction target to another panoramic image data at the reproduction timing on the basis of the time information in response to a user's switching request.

As a result, it is possible to entertain the viewing user and improve entertainment of the panoramic image data by switching a plurality of panoramic image data photographed at an identical time without discomfort.

According to still another aspect of the invention, there is provided a moving picture transmission device including: an acquiring means configured to acquire, from a reproducing means that reproduces selected one of a plurality of panoramic image data photographed at an identical time, identification information on the selected one of the panoramic image data; a data creating means configured to create transmission data such that a unit data amount of another panoramic image data is smaller than that of the one of the panoramic image data; and a transmitting means configured to transmit the created transmission data to the reproducing means.

As a result, it is possible to reduce a total amount of the data transmitted to the reproducer, smoothly switch a plurality of panoramic image data, and improve entertainment of the panoramic image data.

According to still another aspect of the invention, there is provided a moving picture reproducing system including: an acquiring means configured to acquire a plurality of panoramic image data photographed at an identical time; a reproduction control means configured to set selected one of the plurality of panoramic image data as a reproduction target, set a clipped part of the reproduction target as a presentation image, and display the presentation image on a display device; a detecting means configured to detect a detection target set in advance from the plurality of panoramic image data; and a switching control means configured to select one of the panoramic image data from the panoramic image data from which the detection target is detected on the basis of a predetermined priority, and switch the selected one of the panoramic image data to the reproduction target.

As a result, it is possible to automatically switch the panoramic image data without any manipulation of the viewing user and improve entertainment of the panoramic image data.

According to still another aspect of the invention, there is provided a moving picture reproducing device including: an acquiring means configured to acquire a plurality of panoramic image data photographed at an identical time; a reproduction control means configured to set selected one of the plurality of panoramic image data as a reproduction target, set a clipped part of the reproduction target as a presentation image, and display the presentation image on a display device; a detecting means configured to detect a detection target set in advance from the plurality of panoramic image data; and a switching control means configured to select one of the panoramic image data from the panoramic image data from which the detection target is detected on the basis of a predetermined priority, and switch the selected one of the panoramic image data to the reproduction target.

As a result, it is possible to automatically switch the panoramic image data without any manipulation of the viewing user and improve entertainment of the panoramic image data.

According to the present disclosure, it is possible to provide a moving picture reproducing device, a moving picture reproducing method, a moving picture reproducing program, a moving picture reproducing system, and a moving picture transmission device capable of improving entertainment of the panoramic image data.

BRIEF DESCRIPTION OF DRAWINGS

FIG. 22 is a schematic diagram illustrating a system configuration of a moving picture reproducing system according to the second embodiment;

FIG. 25 is a schematic diagram for describing packet data creation (1) according to the second embodiment.

DESCRIPTION OF EMBODIMENTS

Embodiments of the present invention will now be described with reference to the accompanying drawings.

First Embodiment

Figure 1:
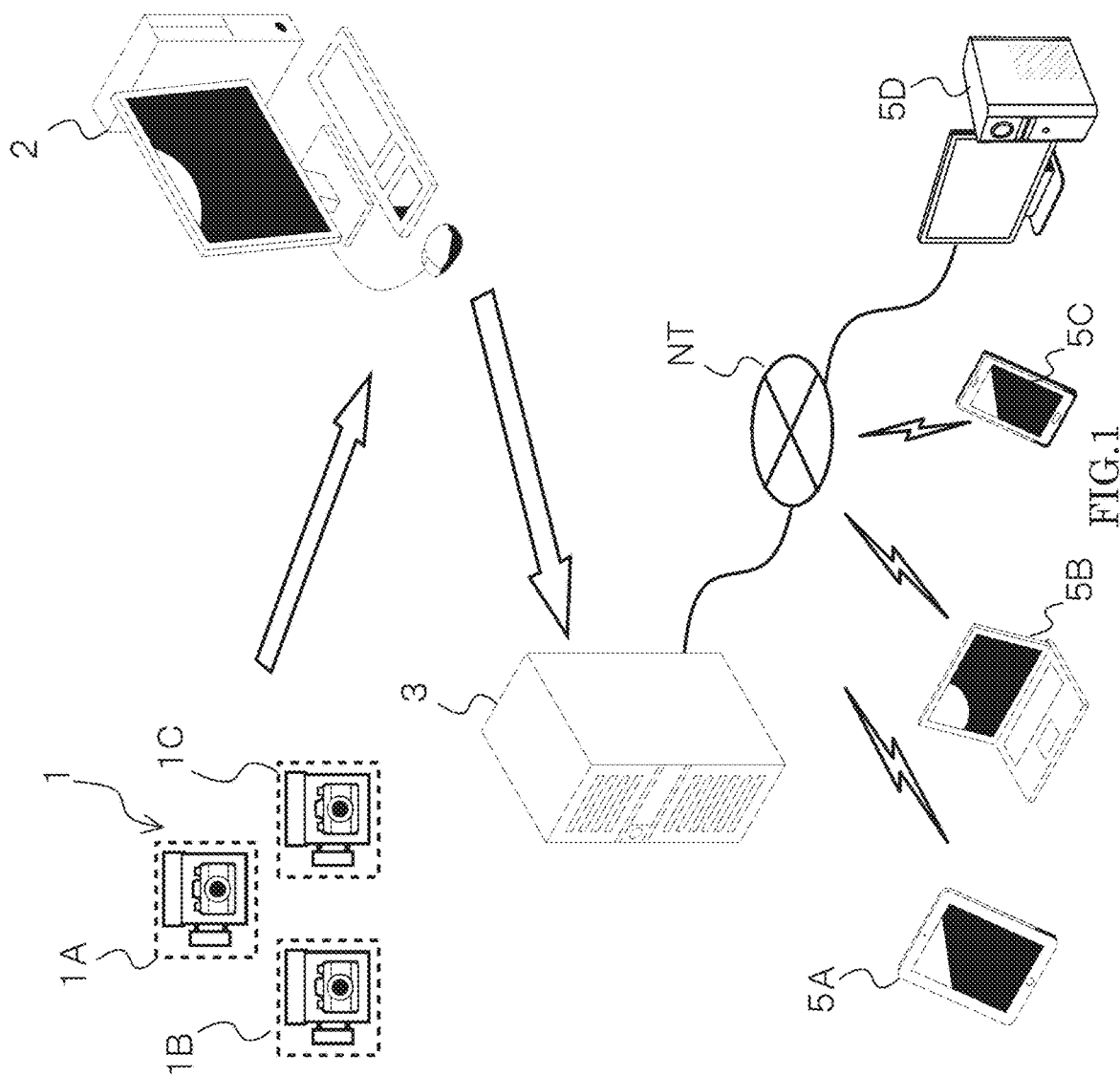
FIG. 1 is a schematic diagram illustrating a system configuration of a moving picture reproducing system according to a first embodiment.

FIG. 1 generally illustrates a moving picture reproducing system 10 having a camera set 1, an editing device 2, a server 3, and a reproducer 5. Herein, typical moving picture data photographed using a single lens will be referred to as "single-image data," and moving picture data created at an angle of view wider than typical ones by combining single-image data or by using a fisheye lens or the like will be referred to as "panoramic image data." The panoramic image data are unnatural because the angle of view is too large for human eyes when it is directly displayed. Therefore, the panoramic image data is typically displayed by clipping only a part matching an angle of view considering a human viewfield range.

The single-image data photographed by the camera set 1 is edited by the editing device 2 to obtain panoramic image data and is stored in the server 3 while the panoramic image data photographed at an identical time are associated with each other. Note that the editing device 2 may also serve as the server.

The server 3 and the reproducer 5 are connected to a network NT such as the Internet in a wired or wireless manner. The panoramic image data stored in the server 3 is transmitted via the network NT, and is reproduced by the reproducer 5 (5A to 5D).

Figure 2:
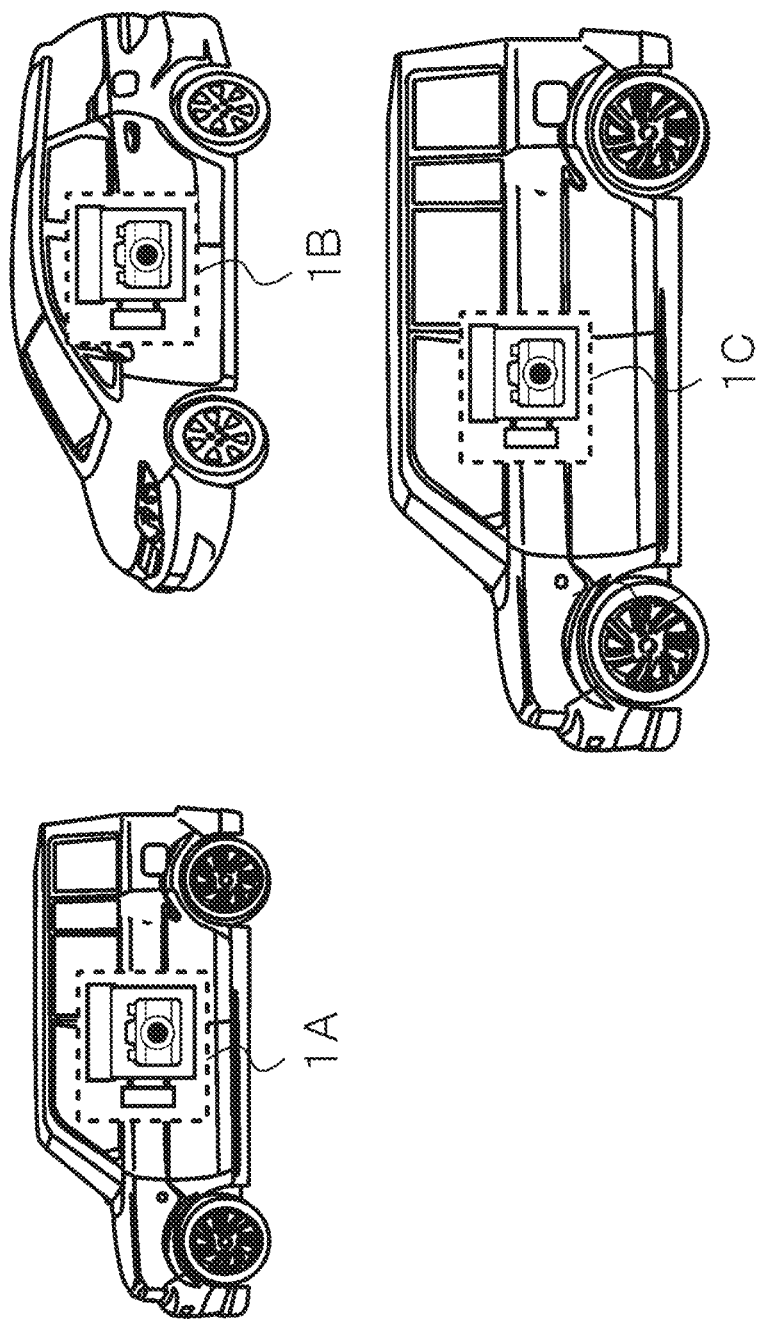
FIG. 2 is a schematic diagram for describing photography according to the first embodiment.

As illustrated in FIG. 2, according to this embodiment, photography is performed using a plurality of camera sets 1. The number of the camera sets 1 is not limited. However, according to this embodiment, it is assumed that three camera sets 1A to 1C are mounted on three vehicles, and each camera set 1A to 1C performs photography.

The camera set 1 is a full-sphere or half-sphere camera set capable of photographing a moving picture at an angle of view of 360° using a single camera set 1, for example, by combining a plurality of cameras or lenses. Here, a camera set 1 obtained by combining six cameras will be described by way of example.

Each camera is embedded with an internal timepiece, and these embedded timepieces are synchronized with each other inside the camera sets 1 and between the camera sets 1. This synchronization of the timepiece is executed, for example, using a radio wave timepiece. Each camera embeds time information in the moving picture data and performs suitable encoding to compress the moving picture data in a predetermined format, so that the compressed data are stored in the camera.

Each camera stores single-image data photographed by itself. Such moving picture data are transmitted to and stored in the editing device 2 in a wired or wireless manner.

Figure 3:
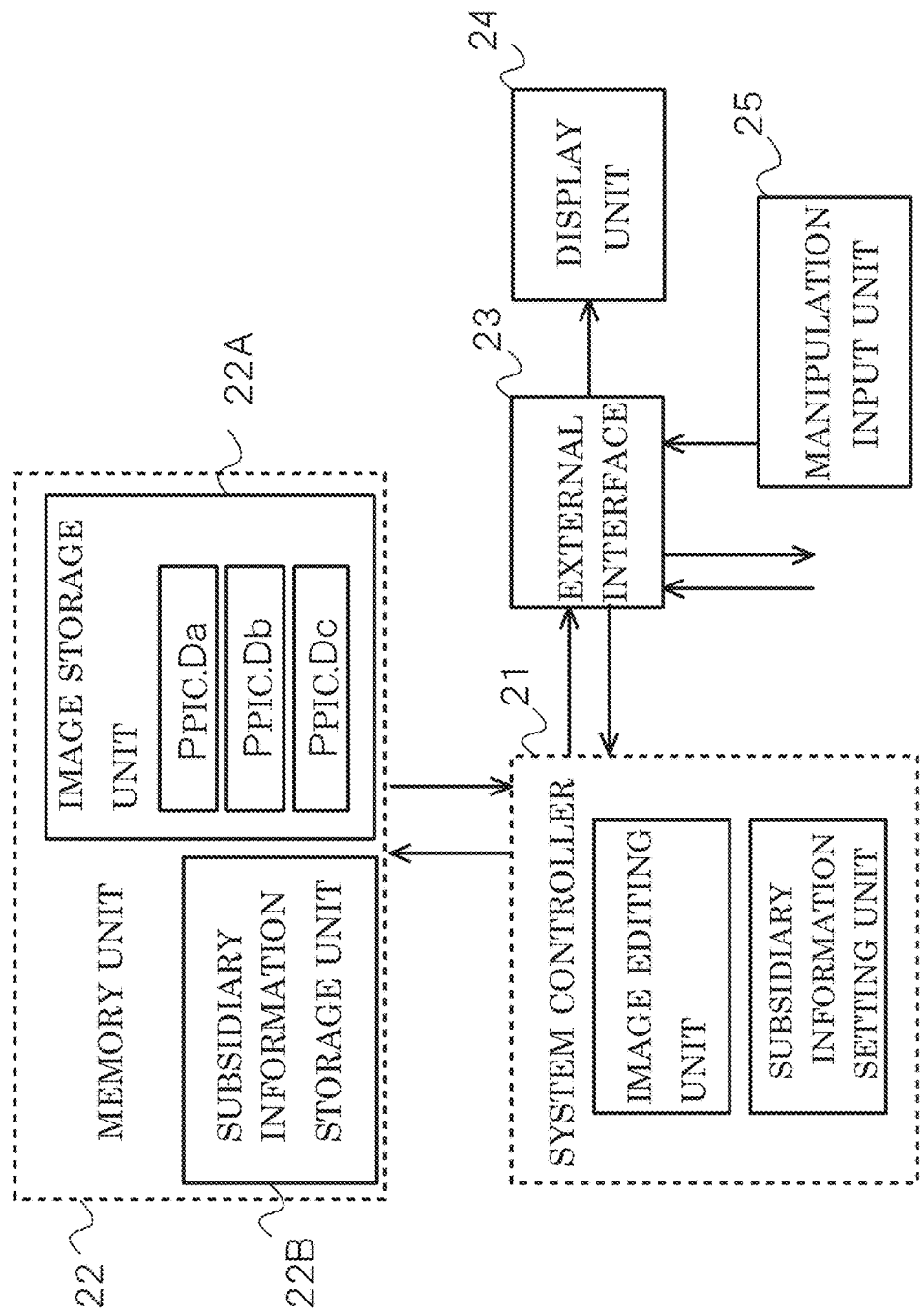
FIG. 3 is a block diagram illustrating a configuration of an editing device according to the first embodiment.

As illustrated in FIG. 3, the editing device 2 has a computer configuration, and a system controller 21 provided with a central processing unit (CPU), a read only memory (ROM), and a random access memory (RAM) not shown in the drawing comprehensively controls the entire editing device 2. The system controller 21 deploys a basic program, an editing program, a subsidiary information setting program, and the like stored in the memory unit 22 such as a flash memory, ROM, or a hard disk drive on the RAM so as to execute various processes or an editing process described below on the basis of such programs.

As a request for executing an editing process is supplied from an editing user via the manipulation input unit 25, the system controller 21 of the editing device 2 starts the editing process. The editing device 2 is connected to each camera in a wired or wireless manner, so that the supplied moving picture data and device IDs (identification) are stored in the image storage unit 22A of the memory unit 22. In addition, hereinafter, the moving picture data photographed by each camera will be referred to as "single-image data."

The image editing unit 21A of the system controller 21 recognizes a combination of the single-image data from the single-image data and the device ID, decodes the single-image data, and combines the single-image data for each camera set 1 in synchronization with time information to synthesize the full-sphere panoramic image data D. Note that the device ID for each camera set 1 is recorded by an editor in advance.

The six single-image data photographed by the camera set 1 becomes an image captured in a spherical shape centered at the photographed portion. However, the image is deployed by applying a mapping method such as a Mercator projection method or a forward azimuth projection method, and is stored in the image storage unit 22A of the memory unit 22 as a planar image. As a result, panoramic image data Da to Dc are created for each of the camera sets 1A to 1C. Note that the synthesized panoramic image data Da to Dc (in the drawings, P-images Da to Dc) are stored in the image storage unit 22A in an encoded state.

The editing device 2 associates the panoramic image data Da to Dc and executes a subsidiary information setting process for facilitating switching between the panoramic image data Da to Dc or tracking of the object. This subsidiary information setting process is executed by appropriately decoding the panoramic image data Da to Dc stored in the image storage unit 22A.

As a manipulation request signal is supplied from the manipulation input unit 25 in response to a request from an editing user to the manipulation input unit 25, the subsidiary information setting unit 21B of the system controller 21 executes the subsidiary information setting process depending on the subsidiary information setting program and records the set subsidiary information in the subsidiary information storage unit 22B of the memory unit 22. Note that, although the panoramic image data Dc is described here, the process similarly applies to the panoramic image data Da and Db.

If intermittent photography is performed, the subsidiary information setting process is executed for each panoramic image data Dc photographed continuously. This subsidiary information setting process is executed for each object serving as a tracking target.

Figure 4:
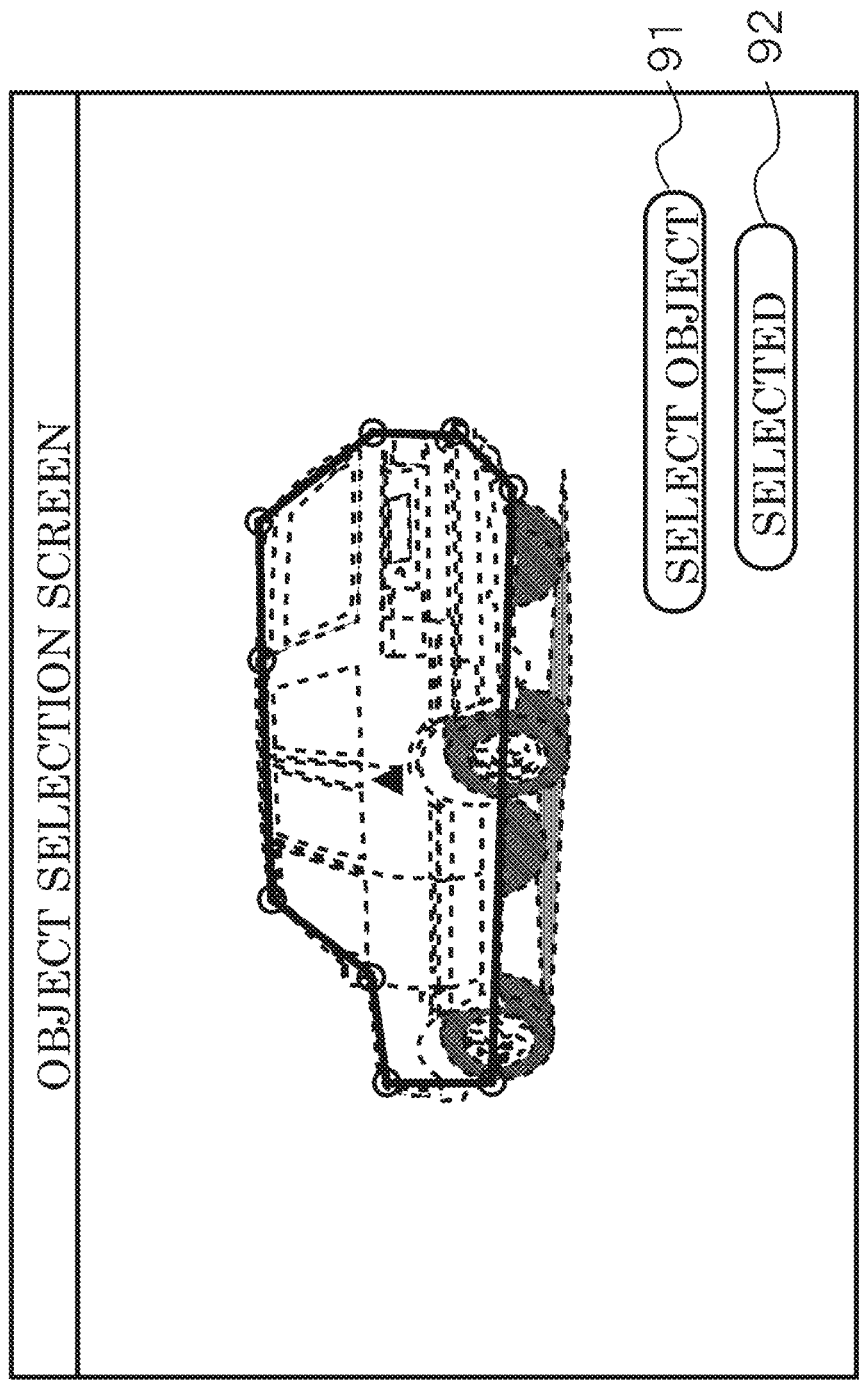
FIG. 4 is a schematic diagram illustrating an object selection screen.

As illustrated in FIG. 4, the subsidiary information setting unit 21B displays an object selection screen to allow the editing user to perform object setting. For example, in the panoramic image data obtained by photographing the vehicle 8A from the vehicle 8C, the editing user selects an object contour as contour coordinates including a plurality of points while a single image is displayed.

In addition, the subsidiary information setting unit 21B receives an object name and additional information (for example, information on passengers or vehicles) regarding the object from the editing user on the basis of presentation on the display unit 24 and registers them on the subsidiary information storage unit 22B as the subsidiary information.

The subsidiary information setting unit 21B determines contour coordinates using motion vectors and contour extraction from each image and stores them as the subsidiary information in the subsidiary information storage unit 22B. Note that extraction of the contour coordinates is not necessarily performed for all of the images, and may be performed, for example, at an interval of one image per ⅙ seconds (that is, six images per one second)

If the contour coordinates calculated from the motion vectors and the contour coordinates calculated from the contour extraction are significantly different, the subsidiary information setting unit 21B displays a pair of images by overlapping the contour coordinates calculated from the motion vectors and the contour coordinates calculated from the contour extraction for the image photographed by the vehicle 8A and allows the editing user to select one of the images.

The subsidiary information setting unit 21B uses the contour coordinates based on the method used for the selected image with a higher priority. If the contour coordinates of the object are extracted using a plurality of methods, and the difference between a plurality of contour coordinates is significant, the editing user is allowed to select any one of them. Therefore, it is possible to improve reliability of the contour coordinates.

In particular, even when a positional relationship between the vehicles is changed during photography, and the side face of the vehicle 8A is changed in the panoramic image data Dc, it is possible to set correct contour coordinates, which is effective.

The subsidiary information setting unit 21B registers the contour coordinates as subsidiary information in the subsidiary information storage unit 22B by associating with the additional information and the time information. In addition, the subsidiary information setting unit 21B registers one of the panoramic image data D to be reproduced with a higher priority (hereinafter, referred to as "high-priority reproduction image data") as subsidiary information to be selected by the editing user in the subsidiary information storage unit 22B.

In this manner, the system controller 21 of the editing device 2 sets the subsidiary information for the panoramic image data Da to Dc in advance. In addition, the system controller 21 registers the panoramic image data Da to Dc and the subsidiary information in the memory unit (not shown) of the server 3 in response to a request from the editing user. The server 3 executes a download process in response to a request of the reproducer 5. At the same time, the reproducer 5 executes a reproduction process.

Figure 5:
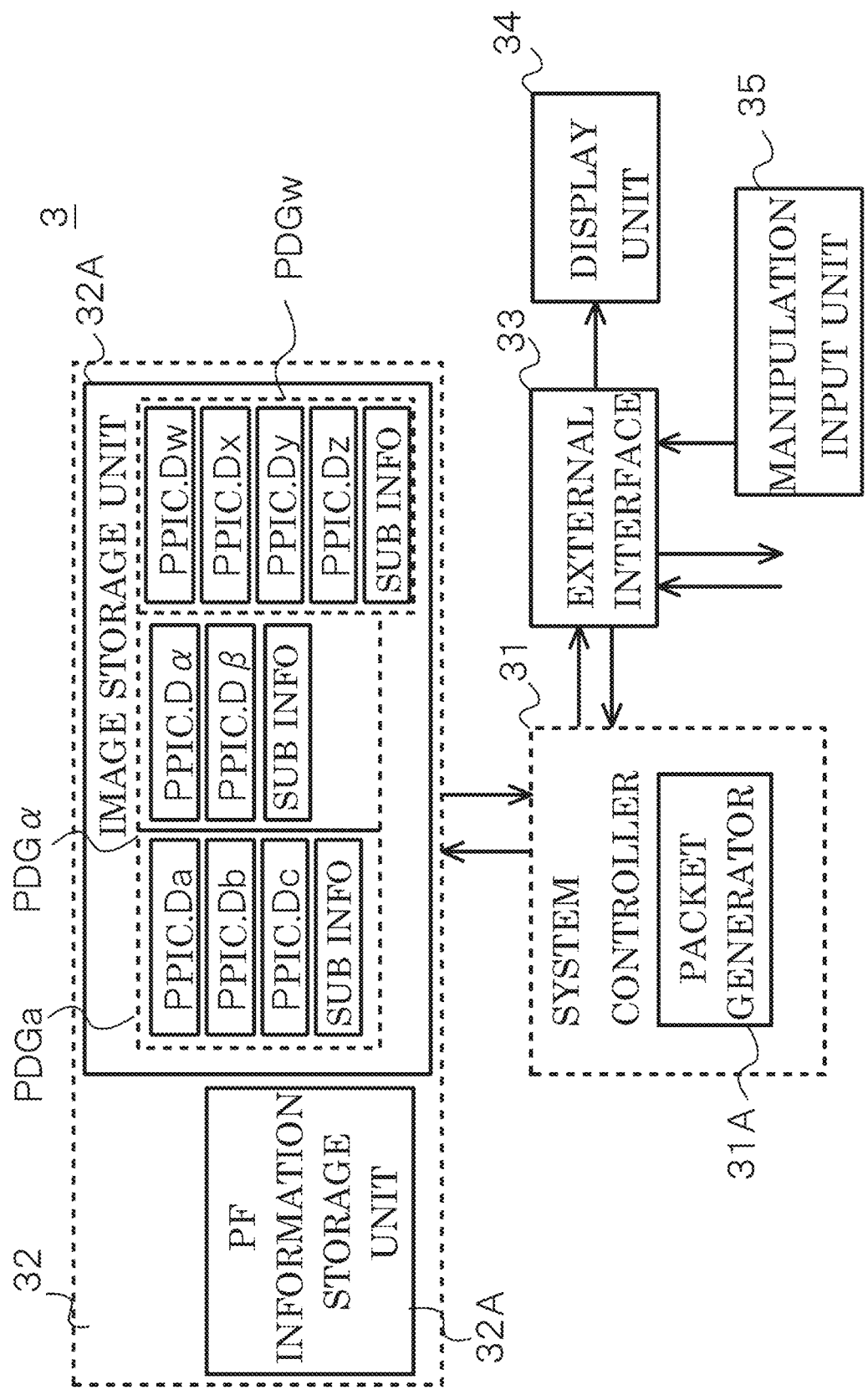
FIG. 5 is a schematic diagram illustrating a tracking target selection screen.

As illustrated in FIG. 5, the server 3 has a computer configuration, and a system controller 31 provided with a central processing unit (CPU), a read only memory (ROM), and a random access memory (RAM) not shown in the drawing comprehensively controls the entire server 3. The system controller 31 deploys a basic program, a streaming transmission program, and the like stored in the memory unit 32 such as a flash memory, ROM, or a hard disk drive on the RAM in order to execute various processes or a download process described below on the basis of such programs.

Figure 6:
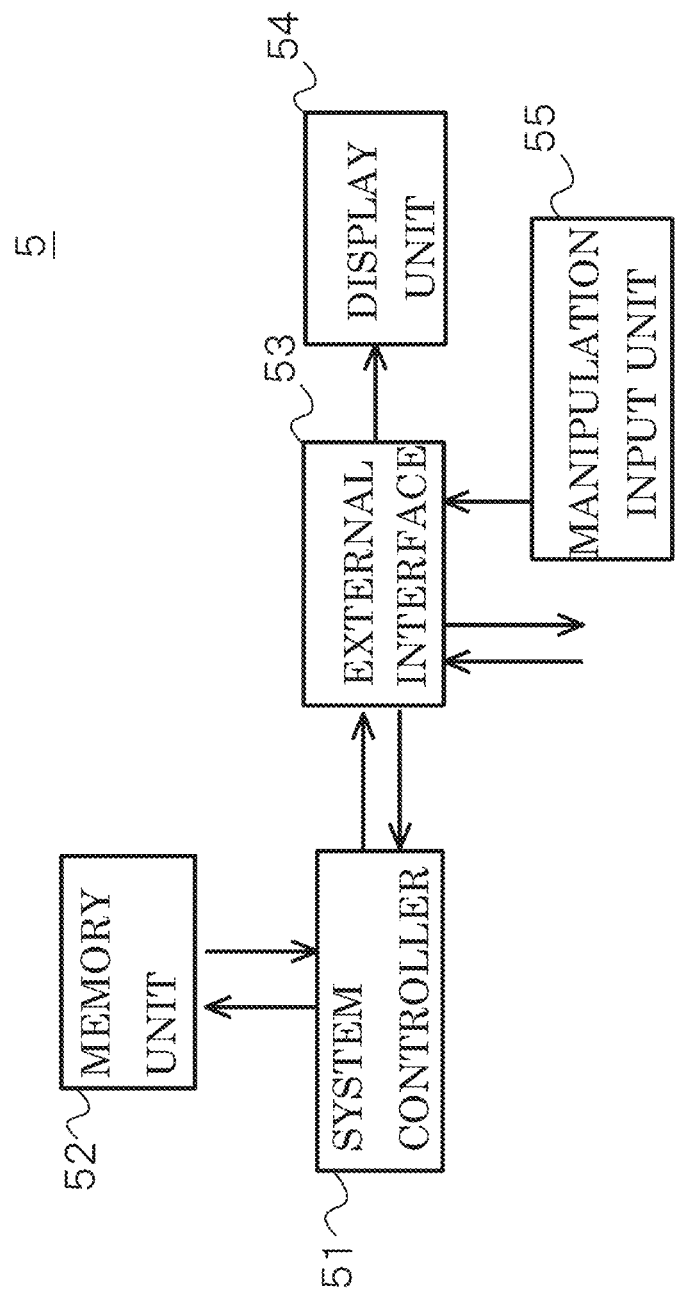
FIG. 6 is a block diagram illustrating a configuration of a server according to the first embodiment.

As illustrated in FIG. 6, the reproducer 5 (5A to 5D) has a computer configuration, and a system controller 51 provided with a central processing unit (CPU), a read only memory (ROM), and a random access memory (RAM) not shown in the drawing comprehensively controls the entire reproducer 5. The system controller 51 deploys a basic program, a reproduction program, and the like stored in the memory unit 52 such as a flash memory, ROM, or a hard disk drive on the RAM in order to execute various processes or a reproduction process described below on the basis of such programs. The reproducer 5 may include a desktop PC, a note PC, and various types of terminals such as a tablet terminal or a smart phone terminal having a PC function. The manipulation input unit 55 may include a mouse, a keyboard, a touch panel, and the like.

The server 3 stores a plurality of image groups PDGs (PDGa, PDGα, PDGw) in the image storage unit 32A of the memory unit 32 by organizing the panoramic image data Da to Dc and the subsidiary information described above as a single image group PDG. In addition, a PF (platform) information storage unit of the memory unit 32 stores data on a webpage of the platform where the panoramic image is reproduced.

A viewing user who owns the reproducer 5 is supplied with data of the webpage of the platform from the server 3 when the viewing user accesses a webpage of the platform via the network NT. A list of the panoramic image data is displayed for each image group PDG on a predetermined webpage of this platform. For example, a single representative image selected by the editing user from the panoramic image data of the image group PDG in advance is displayed on this list of the panoramic image data.

As the viewing user of the reproducer 5 selects a desired image group PDG, for example, by clicking the displayed image, reproduction of the panoramic image data D starts. Hereinafter, a case where a download operation is executed in a so-called progressive download manner, in which reproduction is performed while the image data are temporarily downloaded, will be described by way of example.

Specifically, while the server 3 executes a download process, the reproducer 5 executes a reproduction process. In this reproduction process, the reproducer 5 creates image data by cutting out only the region corresponding to the displayed image size out of the panoramic image data D. Hereinafter, a center of the image displayed in this case will be referred to as "viewpoint coordinates."

In addition, the reproducer 5 shifts the viewpoint coordinates or changes the displayed panoramic image data D in response to a manipulation of the viewing user on the manipulation input unit 55 in order to allow the viewing user to experience a feeling of presence at a shooting site.

The system controller 31 of the server 3 supplies the reproducer 5 with the panoramic image data D and the subsidiary information belonging to the selected image group PDG. Hereinafter, a case where the image group PDGa is downloaded will be described by way of example.

As packet data is created by packetizing the panoramic image data Da to Dc and the subsidiary information belonging to the image group PDGa for each time series, the packet generator 31A of the system controller 31 supplies the packet data to the reproducer 5 via the external interface 33.

As the packet data is supplied via the external interface 53, the system controller 51 of the reproducer 5 stores the packet data in the memory unit 52 and starts a reproduction process in a normal mode.

Specifically, the system controller 51 performs decoding for all of the panoramic image data Da to Dc belonging to the image group PDGa, creates image data by setting the high-priority reproduction image data selected in the subsidiary information as a display target and setting the center coordinates of the high-priority reproduction image data as viewpoint coordinates, and displays the image data on the display unit 54.

If it is requested to shift the viewpoint to the right by a manipulation input from the viewing user on the manipulation input unit 55, the system controller 51 creates presentation image data with respect to the viewpoint coordinates shifted to the right by the coordinates corresponding to the manipulation input from the center coordinates of the high-priority reproduction image data and displays the presentation image data on the display unit 54.

Figure 7:
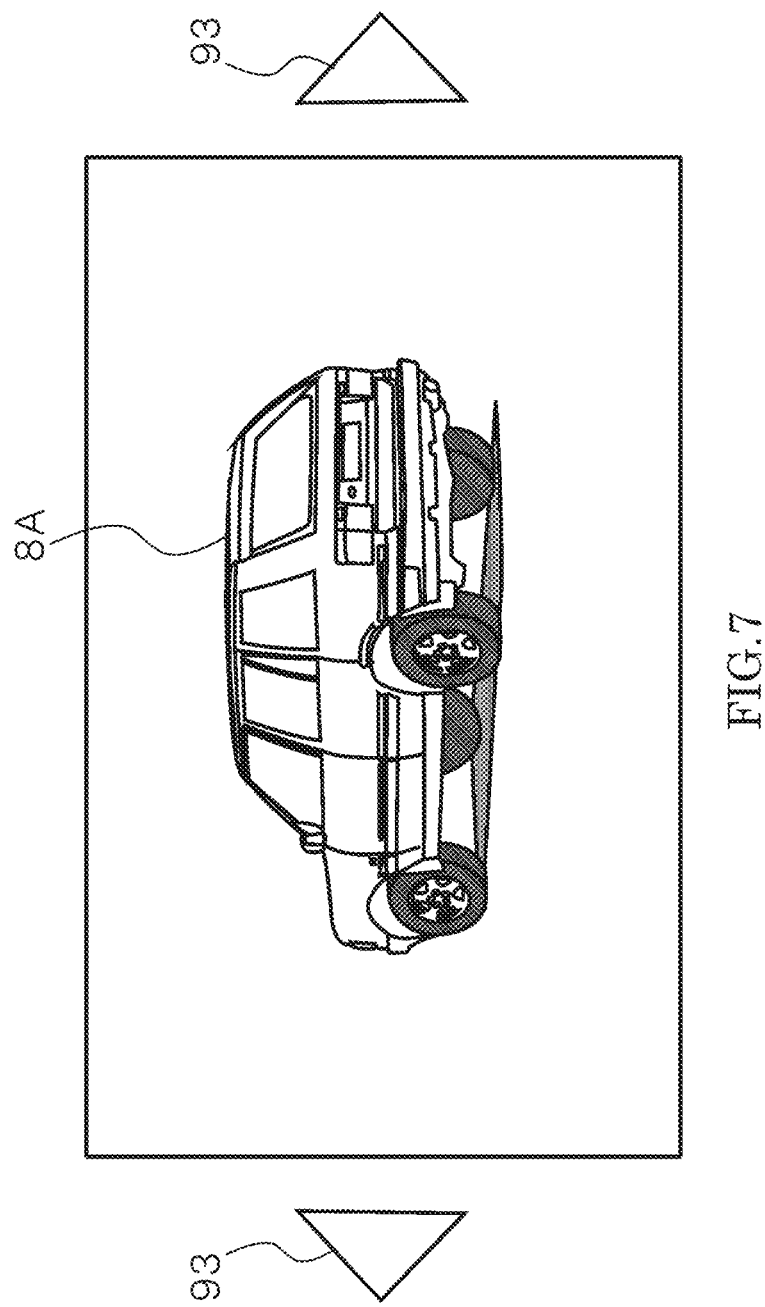
FIG. 7 is a block diagram illustrating a configuration of a reproducer according to the first embodiment.

For example, assuming that three vehicles 8A to 8C run in the vicinity as illustrated in FIG. 1, and the high-priority reproduction image data is the panoramic image data Dc (that is, an image photographed from the vehicle 8C), a presentation image obtained by photographing the vehicle 8A from a diagonally backward left direction is displayed by shifting the viewpoint to the right as illustrated in FIG. 7. Note that the viewpoint coordinates are shifted by controlling a left/right cursor button 93. If the reproducer 5 has a touch panel, it is possible to shift the viewpoint coordinates by a sliding operation or the like.

As described above, the object contour coordinates are registered in the subsidiary information. The system controller 51 may execute a tracking process by setting the object as a tracking target using the contour coordinates.

Figure 8:
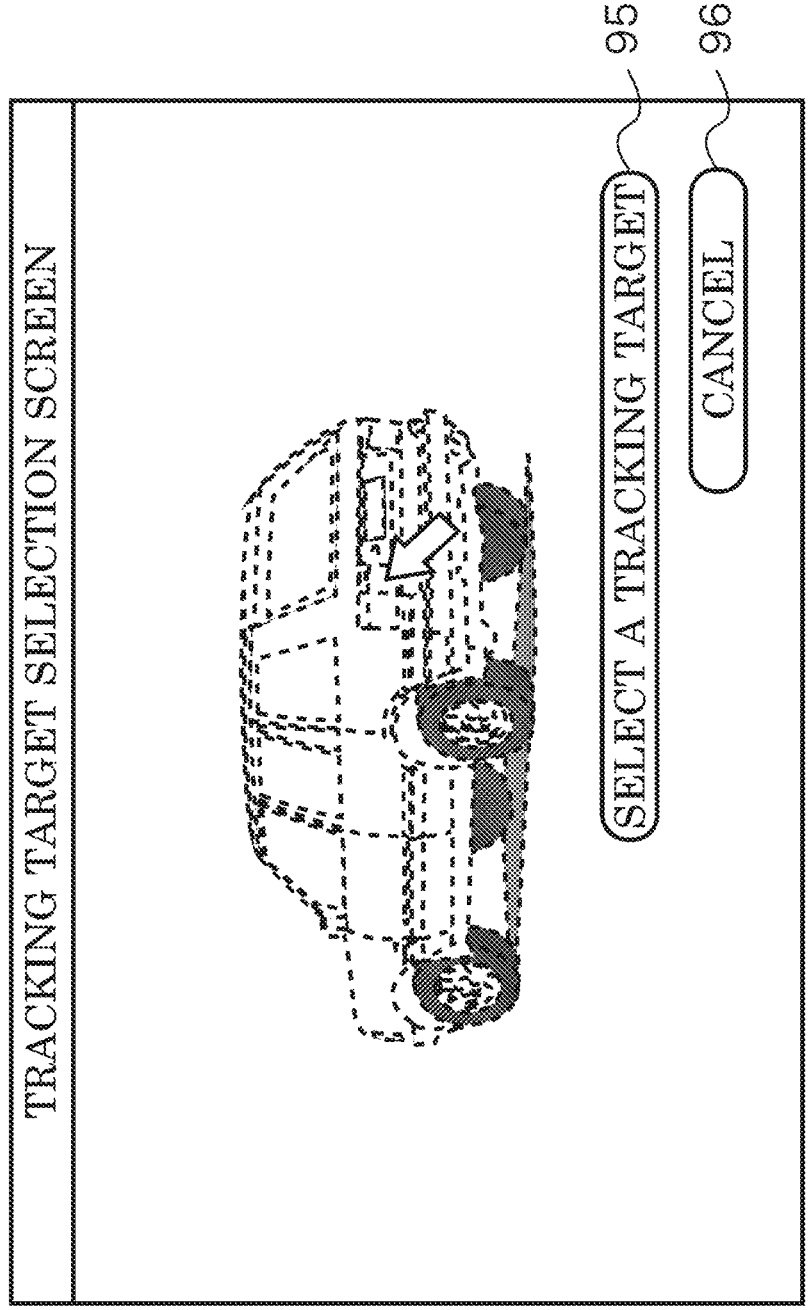
FIG. 8 is a schematic diagram for describing panoramic image data switching (1)

If a request signal for setting tracking is supplied by clicking the setting button (not shown) displayed on the screen, the system controller 51 displays a tracking selection screen as illustrated in FIG. 8. The presentation image data is displayed on this tracking target selection screen as in a normal reproduction. In addition, a tracking target selection button 95 and a cancellation button 96 are displayed. In this state, if the viewing user loads the cursor 99 on the object of which the contour coordinates have been registered, the system controller 51 displays the object by changing the color. Note that whether or not it is the object is determined on the basis of the contour coordinates of the subsidiary information.

Here, if a request signal for determining the tracking target is supplied as the viewing user clicks a decision button (not shown), the system controller 51 transitions to a tracking mode to set the vehicle 8C as a tracking target.

The system controller 51 creates image data with respect to the center point of the contour coordinates and displays the image data on the display unit 54. The system controller 51 creates the presentation image data with respect to the center point of the contour coordinates of the vehicle 8C and displays the presentation image data on the display unit 54 until the tracking setting is released.

Figure 9:
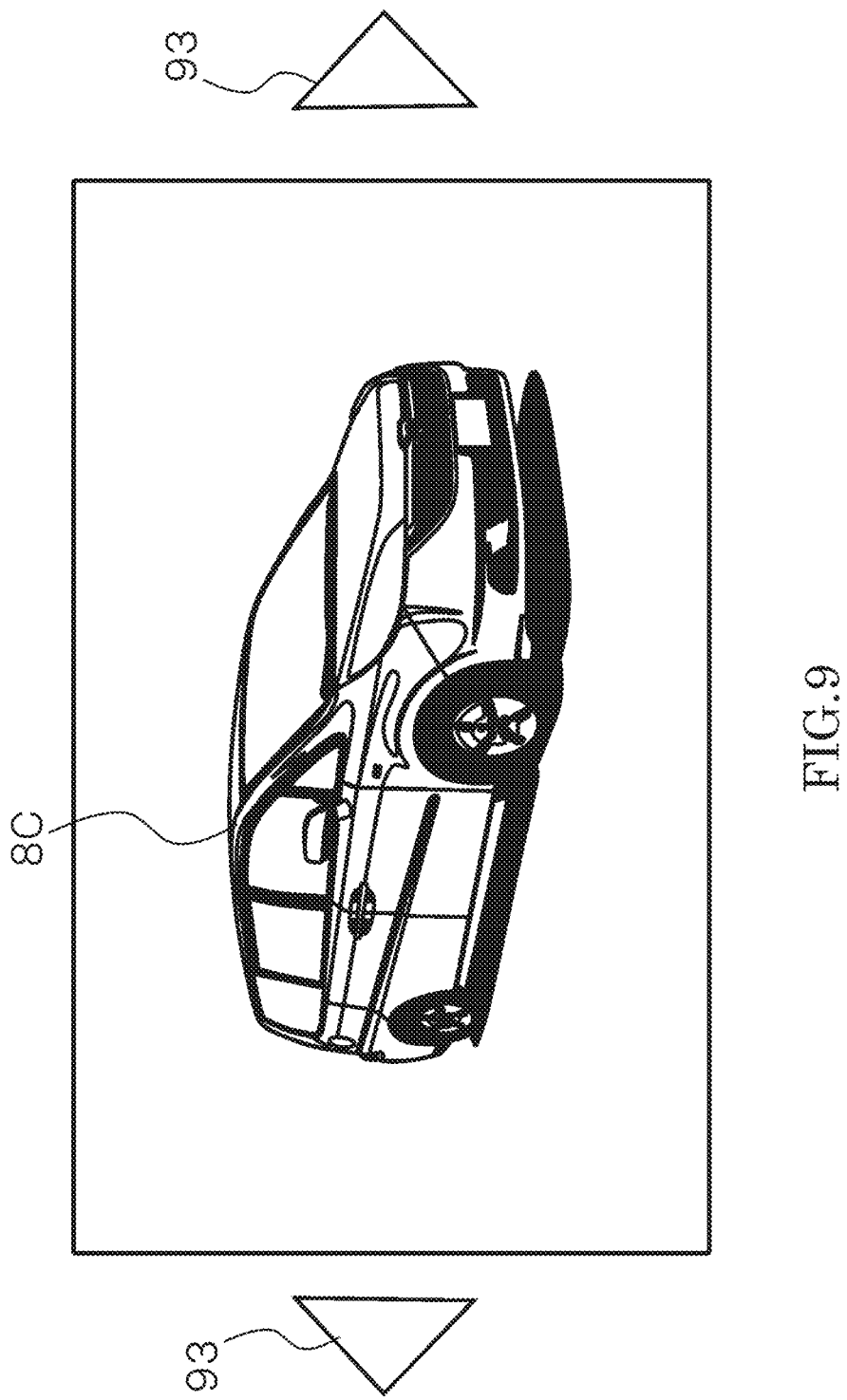
FIG. 9 is a schematic diagram for describing panoramic image data switching (2)

As a result, as illustrated in FIG. 9, a presentation image obtained by centering the vehicle 8A in the panoramic image data Dc is displayed on the display unit 54.

If the viewing user clicks the vehicle 8A, switching to the panoramic image data Da photographed from the vehicle 8A is executed.

If clicking of the vehicle 8A in a normal mode is recognized, the system controller 51 creates the presentation image data by changing the presentation target to the panoramic image data Da and setting the viewpoint coordinates on the vehicle 8C from which the panoramic image data Dc as a presentation target before switching has been obtained.

As a result, the viewing user can recognize his/her viewpoint before switching and can re-recognize a feeling of jump before and after the switching as if "Oh, I was over there."

Figure 10:
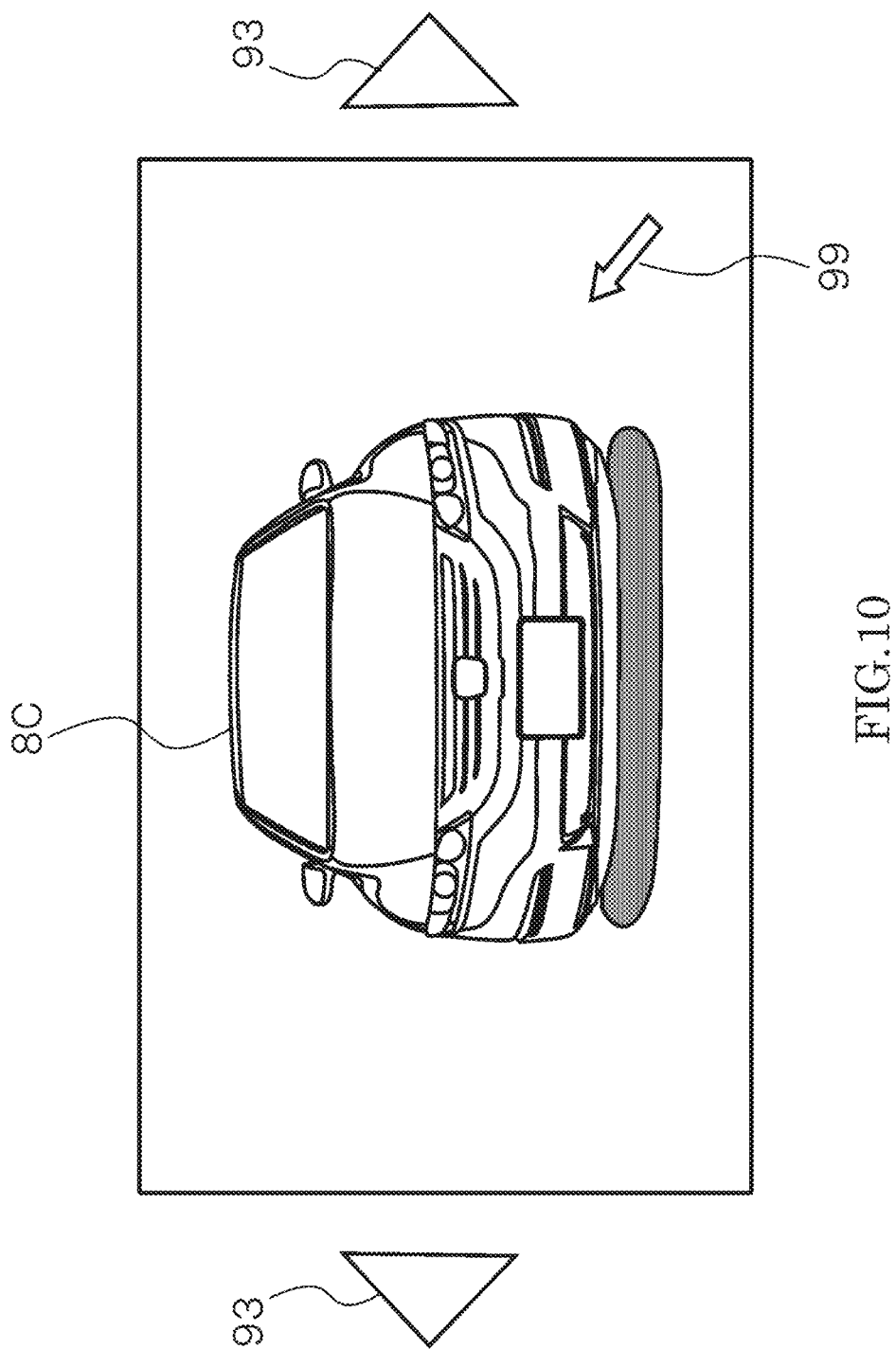
FIG. 10 is a schematic diagram for describing panoramic image data switching (3)
Figure 11:
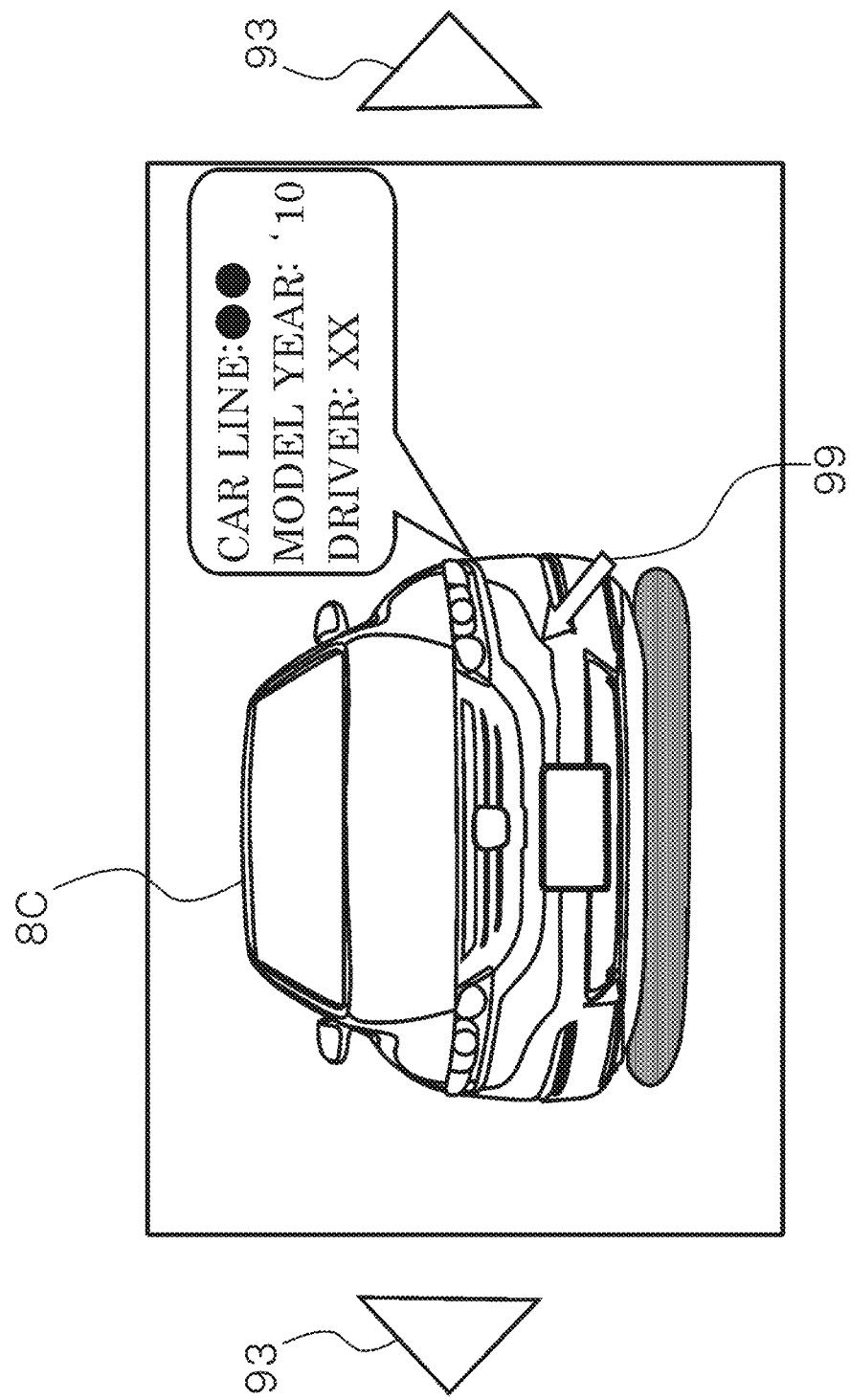
FIG. 11 is a schematic diagram for describing presentation of additional information.

When the viewing user shifts the viewpoint coordinates to the left direction, the vehicle 8C is displayed as illustrated in FIG. 10. Then, when the viewing user loads the cursor 99 on the vehicle 8C as illustrated in FIG. 11, the system controller 51 reads the additional information in the subsidiary information on the vehicle 8C and displays it on the image.

Specifically, the system controller 51 monitors a position of the cursor 99. When coordinates of a tip of the cursor 99 enter the inside of the contour coordinates, the system controller 51 reads the additional information of the subsidiary information from the image storage unit 32A and creates the presentation image data by overlapping the additional information.

As a result, the viewing user can acquire information regarding the object such as a vehicle type, a photographic time, a travel distance, and an episode.

In this manner, a plurality of panoramic image data D are associated with each other to treat them as an image group PDG, and the viewing user can freely view a plurality of panoramic image data D photographed at an identical time by switching the panoramic image data D in response to a predetermined manipulation. Therefore, it is possible to improve entertainment as the panoramic image data D.

In addition, as the object set in advance is selected, the presentation image is switched to the panoramic image data D photographed from the selected object. As a result, it is possible to allow the viewing user to feel like warping between the shooting points. Therefore, it is possible to increase enjoyment of the viewing user.

Second Embodiment

In a second embodiment illustrated in FIGS. 12 to 17, like elements are denoted by like reference numerals obtained by adding "100" to those of the first embodiment illustrated in FIGS. 1 to 11, and they will not be described repeatedly. The second embodiment is different from the first embodiment in that more camera sets are used in a wide hall, and the panoramic image data are transmitted in a real-time manner.

Figure 12:
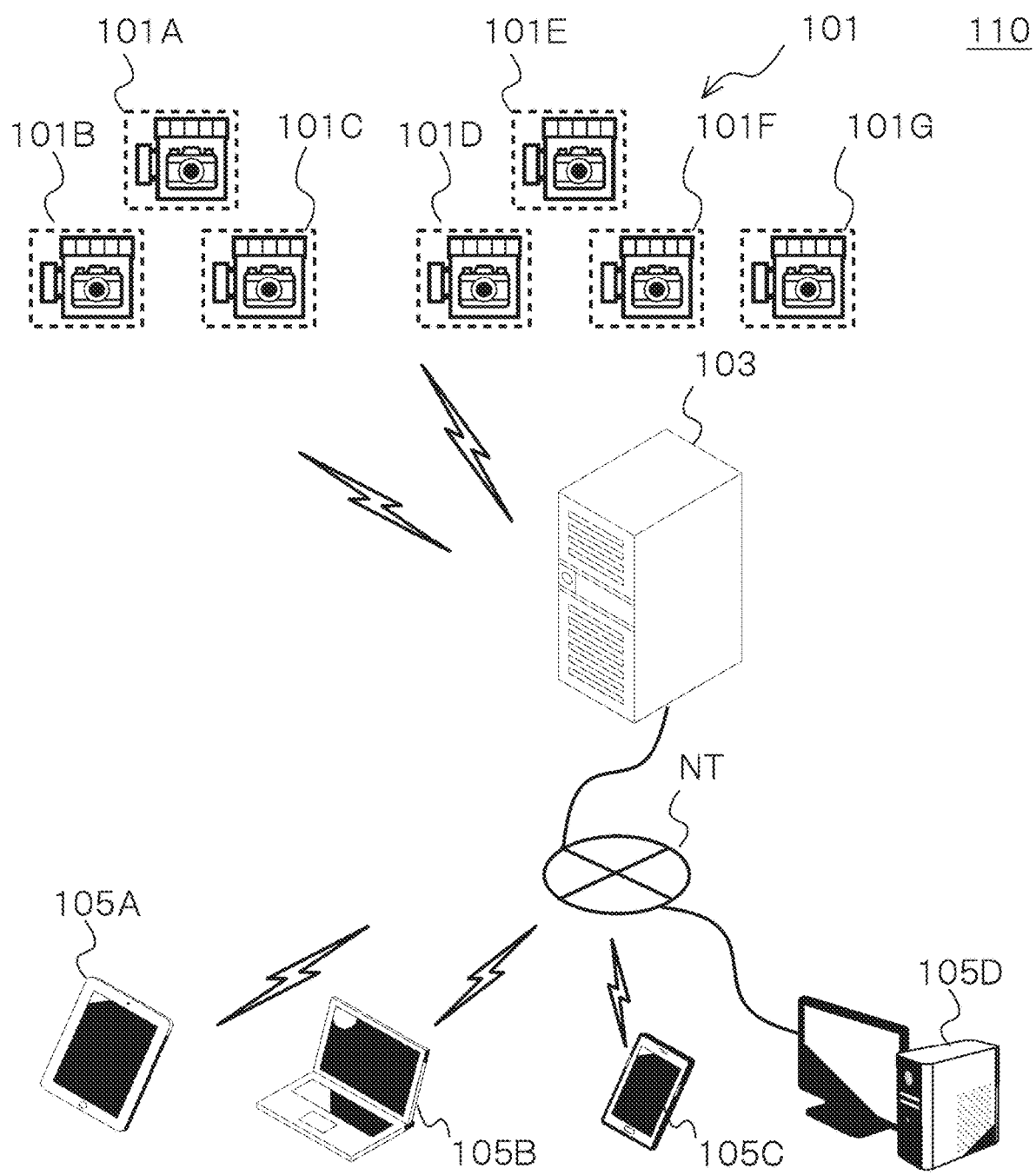
FIG. 12 is a schematic diagram illustrating a system configuration of a moving picture reproducing system according to a second embodiment.

As illustrated in FIG. 12, according to the second embodiment, the image data photographed by seven camera sets 101 (101A to 101G) are transmitted to the server 103 and are edited. In addition, the image data are directly streamed from the server 103 via the network NT.

Figure 14:
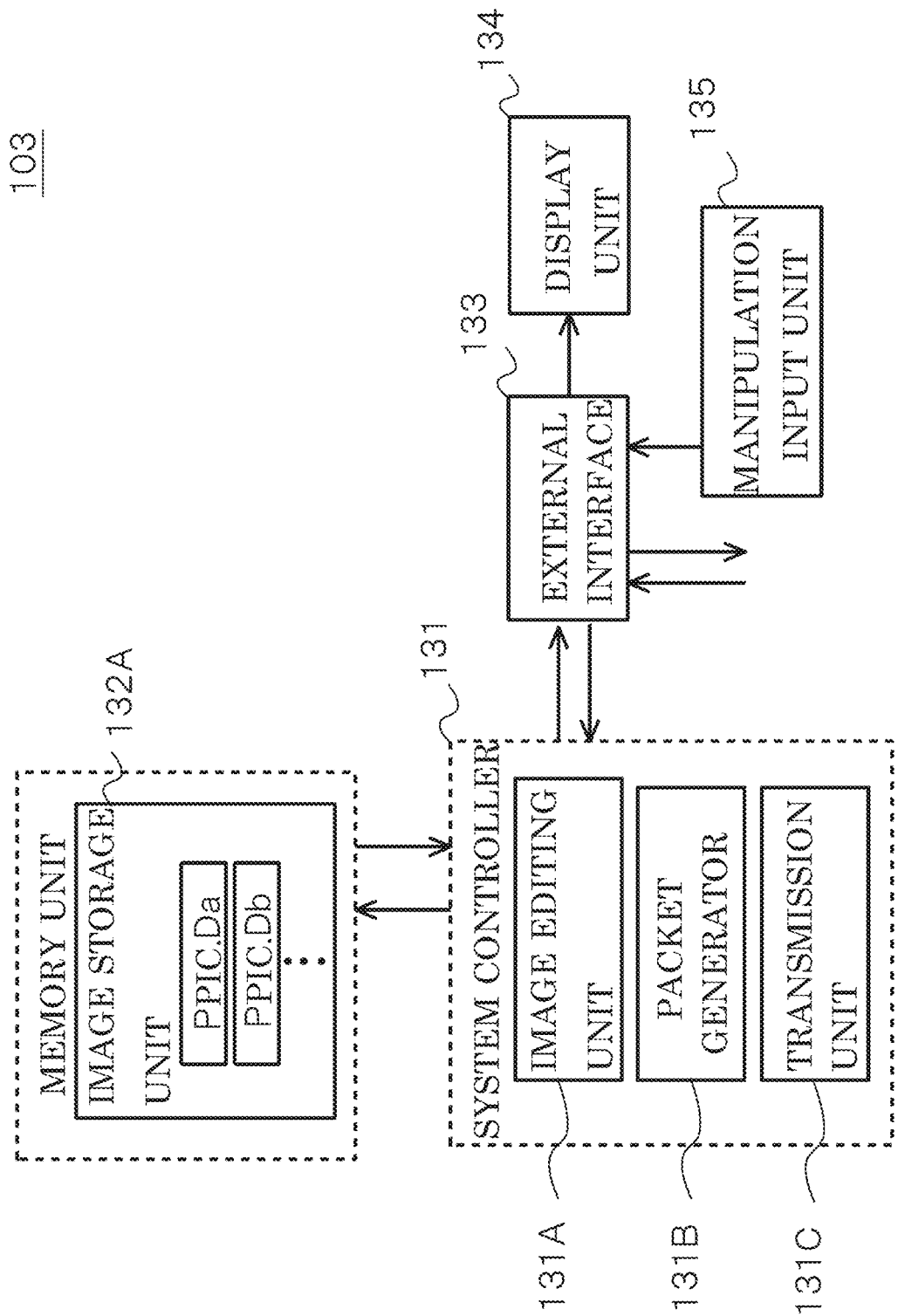
FIG. 14 is a block diagram illustrating a configuration of a server according to the second embodiment.
Figure 15:
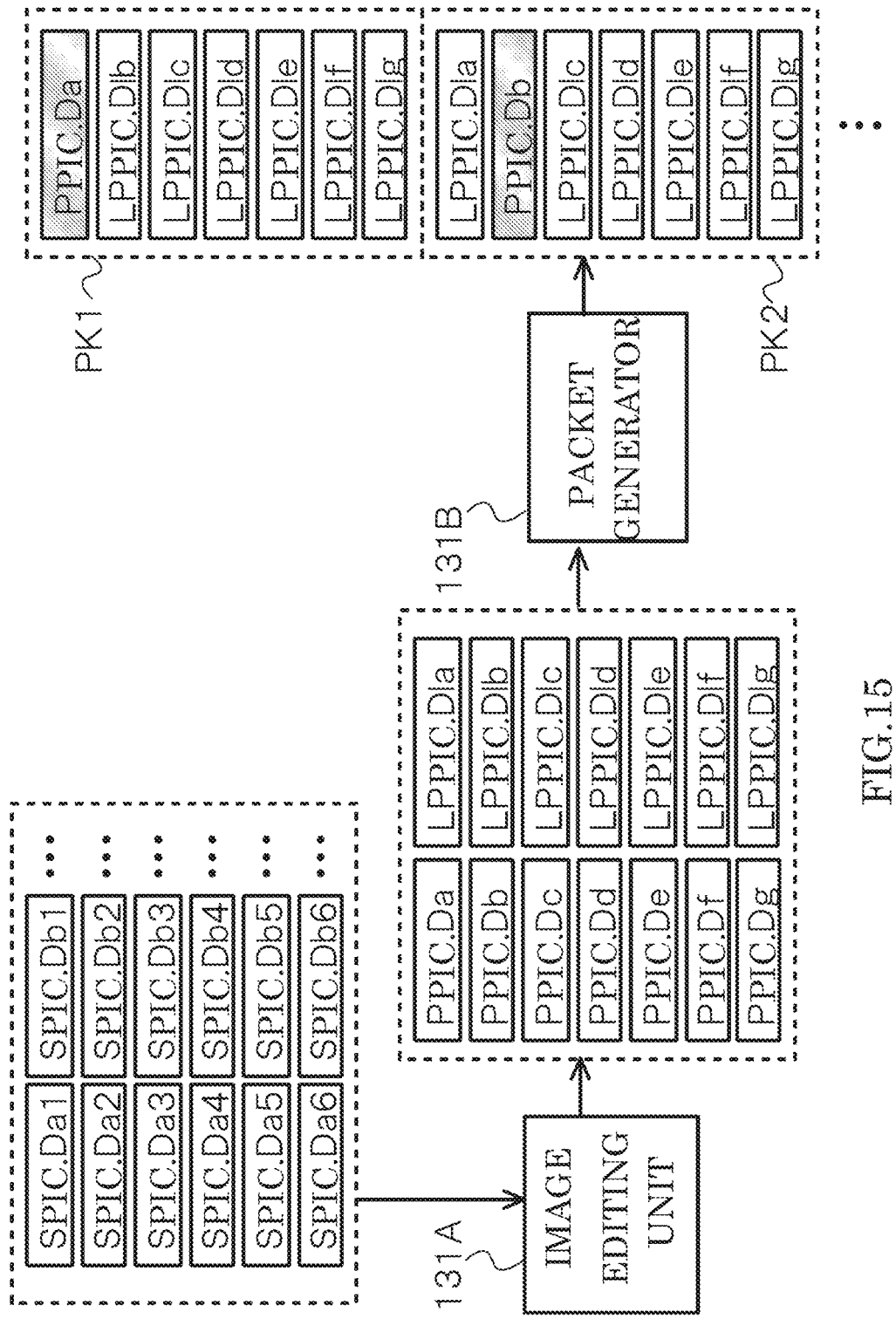
FIG. 15 is a schematic diagram for describing packet data creation (1) according to the second embodiment.
Figure 16:
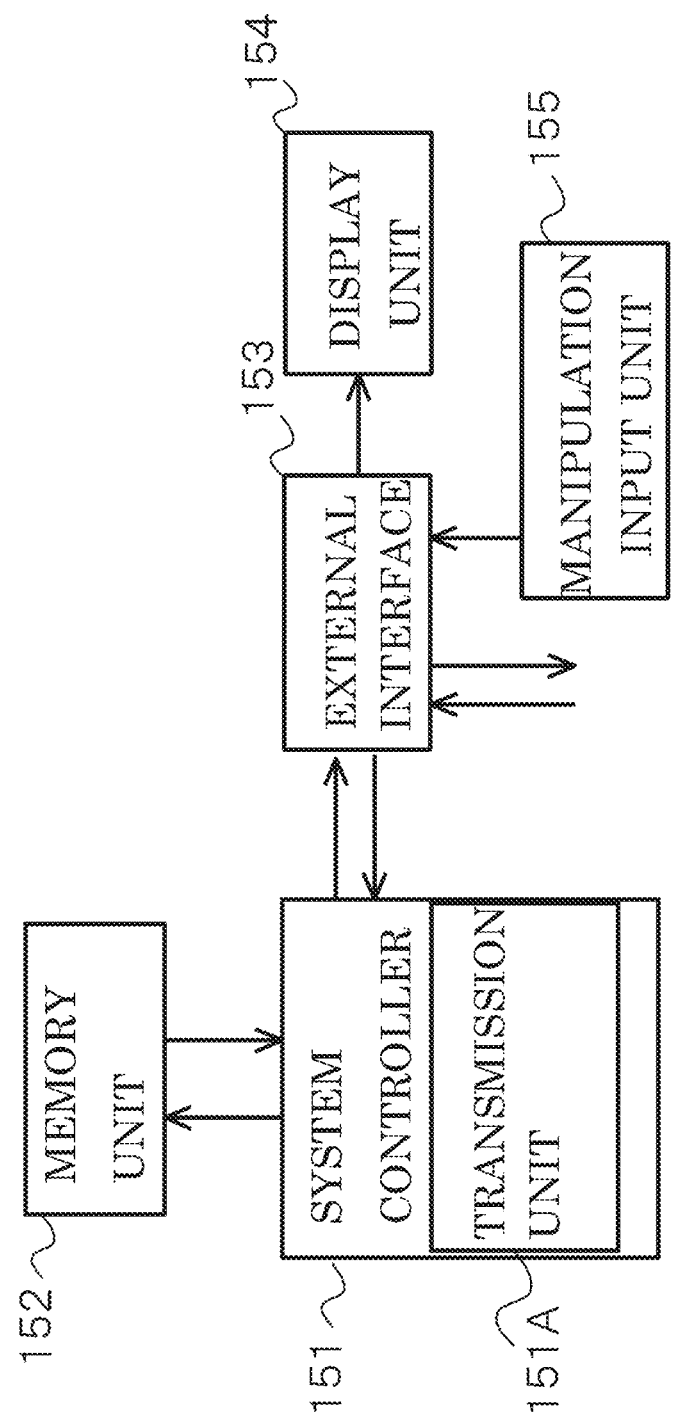
FIG. 16 is a block diagram illustrating a configuration of a reproducer according to the second embodiment.

Therefore, as single-image data is supplied, the system controller 131 of the server 103 combines the single-image data using the image editing unit 131A to create panoramic image data D (Da to Dg) as illustrated in FIGS. 14 and 15.

Meanwhile, the panoramic image data D is naturally a planar image obtained by combining the single-image data of six images. However, as the angle of view is wide, its data amount increases relative to that of the typical image data.

If all of the panoramic image data Da to Dg having a large data amount are directly transmitted, a communication load of the server 103 significantly increases. In this regard, the server 103 generates a combination of packets depending on each mode and transmits them to the reproducer 105.

A packet PK supplied from the server 103 is temporarily stored in the RAM of the system controller 151 of the reproducer 105 and is used in reproduction. Then, the packet PK is eliminated without being stored in the memory unit 152.

Figure 13:
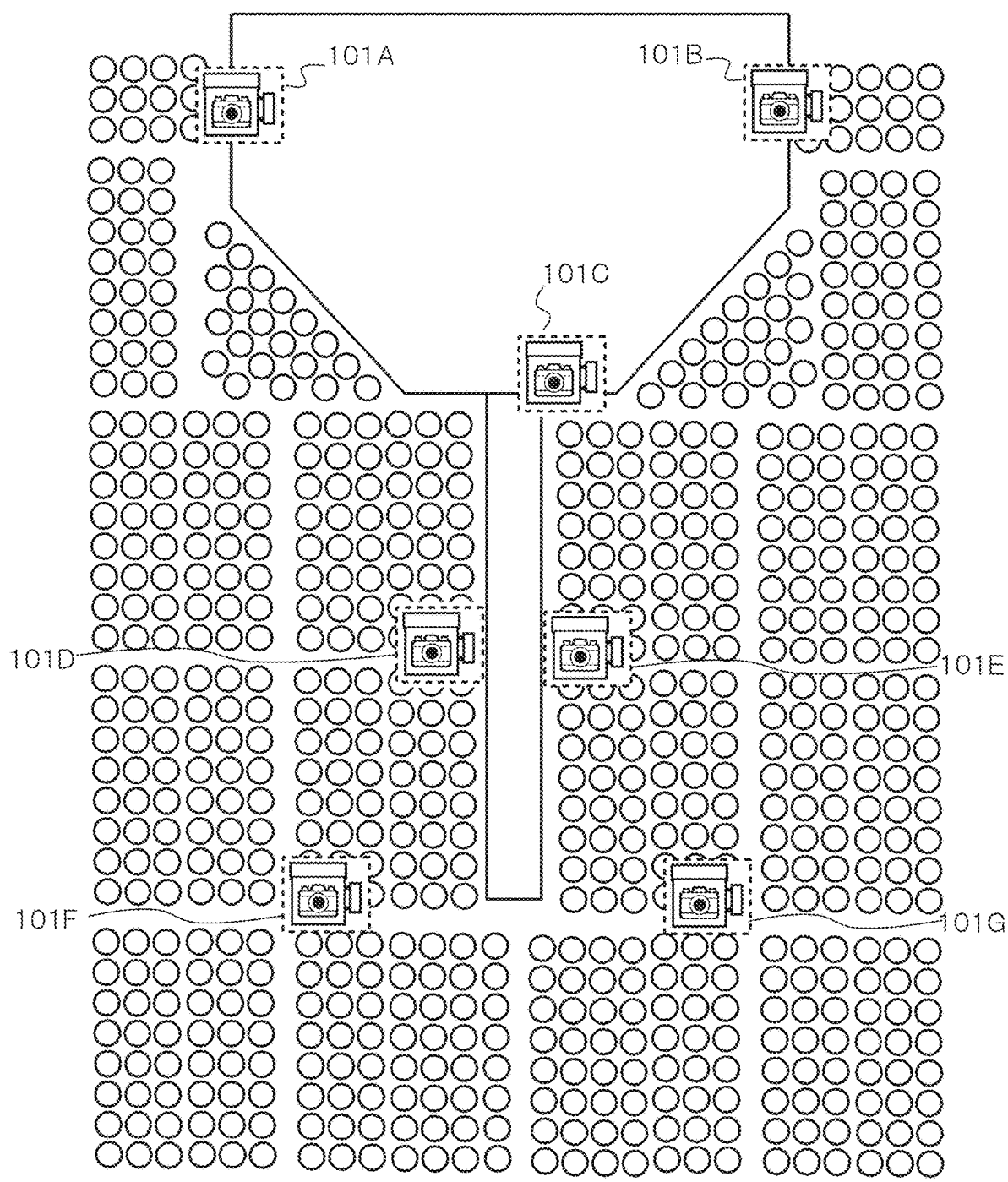
FIG. 13 is a schematic diagram for describing photography according to the second embodiment.

A case where photography is performed in a concert hall, and the photographed images are transmitted in a real-time manner as illustrated in FIG. 13 will be described by way of example.

According to this embodiment, three modes are assumed, including a manual mode in which each viewing user selects desired panoramic image data D and viewpoint coordinates by himself/herself, a self-manual mode in which the panoramic image data D is selected by the viewing user, and the viewpoint coordinates are set using a tracking function, and an automatic mode in which both the panoramic image data D and the viewpoint coordinates are automatically selected.

The viewing user selects which mode is used by the reproducer 105 and sets the mode. The server 103 transmits packets corresponding to the set mode to the reproducer 105.

First, the manual mode will be described.

In the manual mode, the viewing user is allowed to select what to view by himself/herself. A small screen or a thumbnail screen showing the camera arrangement is displayed beside the presentation image data. The viewing user can view the panoramic image data D photographed by the corresponding camera by clicking the camera. In addition, the viewing user can also set the viewpoint coordinates by himself/herself.

The small screen or the thumbnail screen showing the camera arrangement contains a camera diagram by emulating the camera sets. A direction indicated by the camera diagram is a direction of the viewpoint coordinates immediately after switching of the panoramic image data D. On this screen, it is possible to associate the direction of the viewpoint coordinates with the camera direction in the diagram and display the camera set by changing the camera direction in the diagram as the viewpoint coordinates are shifted. This makes it easier to see which direction the viewing user is facing currently.

Since the viewing user can look around 360° in one place, the viewing user can feel as if he/she is participating in a concert and watch the panoramic image data D photographed from the camera near the stage depending on a situation.

In this manual mode, it is unknown when the viewing user changes the viewed panoramic image data D by switching the camera. Typically, a little time is necessary in the decoding. Therefore, a time lag occurs if the corresponding panoramic image data D is supplied after the viewing user requests the switching. Meanwhile, if the corresponding panoramic image data D are supplied to all of the cameras, a communication load becomes large.

In this regard, the server 103 according to this embodiment supplies the panoramic image data D that are being currently viewed at a normal reproduction rate and also supplies low-rate panoramic image data DI (DIa to DIg) by reducing the rate of the panoramic image data D that are not viewed (for example, reduction by approximately $\frac{1}{10}$ to $\frac{1}{3}$).

The reproducer 105 transmits reproduction identification information for the panoramic image data D that are being currently reproduced to the server 103 at all times. Therefore, the reproducer 105 requests the server 103 to supply packets PK with respect to the panoramic image data D indicated by this reproduction identification information.

As illustrated in FIG. 15, the packet generator 131B of the system controller 131 generates the packet PK1 by combining the panoramic image data Da and the low-rate panoramic image data DIb to DIg (in the drawing, LP image). This packet PK1 is supplied to the reproducer 105 that currently reproduces the panoramic image data Da.

Similarly, the packet generator 131B generates the packet PK2 by combining the panoramic image data Db and the low-rate panoramic image data DIa and DIc to DIg (in the drawing, LP image). This packet PK2 is supplied to the reproducer 105 that are producing the panoramic image data Db currently.

Subsequently, the packet generator 131B generates the packets PK3 to PK7 in a similar way. In addition, the system controller 131 supplies the packets PK depending on a reproduction status of the reproducer 105.

When the viewing user switches the camera, the reproducer 105 displays an image based on the low-rate panoramic image data DI and requests the server 103 to supply the packet PK corresponding to the panoramic image data D that are being produced currently.

As the request signal is received, the server 103 changes the packet PK supplied to the reproducer 105 immediately and supplies the corresponding packet PK to the camera that is being used for reproduction currently.

As a result, the server 103 can avoid a trouble that may be generated due to supply of a large amount of data in advance and can display the image based on the panoramic image data D subjected to the switching to the viewing user without a delay.

In this manner, in the manual mode, the normal reproduction rate is set only for the panoramic image data D that are being produced, and the panoramic image data that are not being reproduced are supplied to the reproducer 105 by reducing the reproduction rate.

Next, the semi-manual mode will be described. In the semi-manual mode, the viewing user sets the camera (panoramic image data D) by himself/herself, and the viewpoint coordinates are changed automatically.

The viewing user sets the tracking target using the reproducer 105. The setting of the tracking target is performed by the system controller 151 of the reproducer 105 instead of the server 103. Similar to the manual mode, the packet PK is supplied to the camera set by the viewing user by combining the corresponding panoramic image data D and the low-rate panoramic image data DI.

The tracking unit 151A of the system controller 151 decodes the panoramic image data D and detects the tracking target using face authentication based on a planar image or a 3-dimensional polygon, motion vectors, and the like. In addition, the system controller 151 creates the presentation image data by setting the vicinity of the center of the detected tracking target as the viewpoint coordinates.

In this manner, by automatically tracking the tracking target using the panoramic image data D from the fixed camera, it is possible to eliminate a manipulation of tracking the tracking target while allowing a user to feel as if he or she is in the concert. Therefore, it is possible to allow the viewing user to enjoy the concert by concentrating on the presentation image.

Next, the automatic mode will be described. In the automatic mode, the server 103 supplies suitable panoramic image data D and tracking information representing information of the viewpoint coordinates as a packet PK depending on the setting of the tracking target of the viewing user. In this automatic mode, the viewing user is allowed to perform shifting of the viewpoint coordinates or zooming. However, the viewing user is not allowed to switch the camera. Naturally, the camera can be switched if the mode is switched to the manual mode or the semi-manual mode.

Specifically, the viewing user sets the tracking target using the reproducer 105. The setting of the tracking target is performed using the system controller 131 of the server 103. Here, a case where the tracking target is set to one idol star will be described by way of example.

Figure 17:
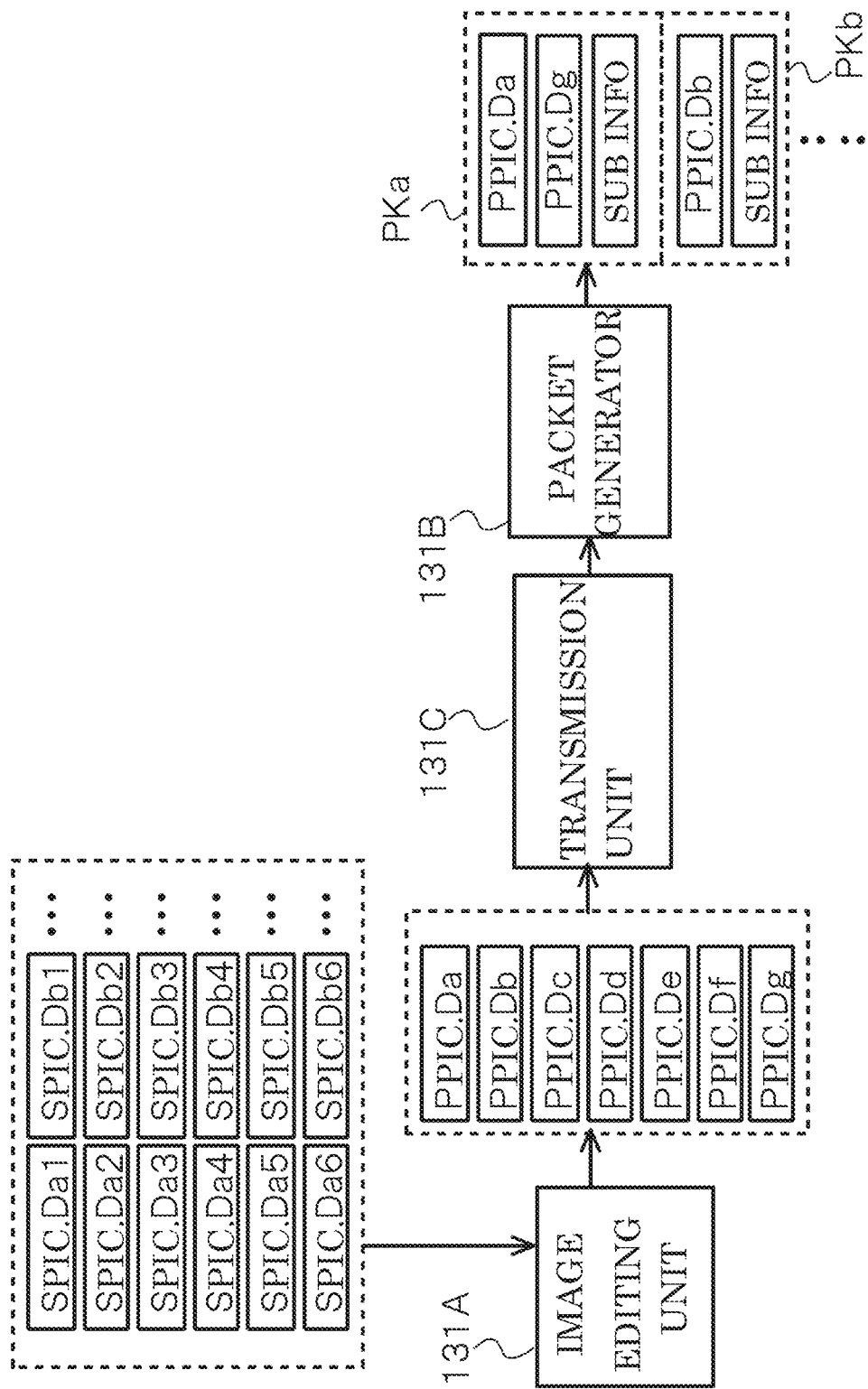
FIG. 17 is a schematic diagram for describing packet data creation (2) according to the second embodiment.

As illustrated in FIG. 17, the transmission unit 131C of the system controller 131 detects a tracking target from the panoramic image data D and supplies information on the tracking target to the packet generator 131B as the tracking information.

The packet generator 131B selects one of the panoramic image data D on the basis of an area of the tracking target, a motion length, a face size, brightness, and the like, and generates a packet PK by setting the coordinate information of the tracking target of the selected panoramic image data D as the tracking information. If the panoramic image data D selected in the middle of the packet PK is switched, two (or more) panoramic image data D and tracking information are generated as the packet PK (for example, packet PKa).

The system controller 151 of the reproducer 105 sequentially decodes the supplied packet PK and creates the presentation image data by setting the coordinate information indicated by the tracking information as the viewpoint coordinates.

In this automatic mode, all of the participants may be set as the tracking target without limiting the number of tracking targets to one person. For example, this case may be employed when there is no specific favorite in a concert of an idol group in which a plurality of persons participate.

In this case, the system controller 131 of the server 103 selects a panoramic image data D in which all of the participants of the idol group are presented as large as possible (that is, an area ratio is large). In addition, when there is a something moving other than the tracking target, such as a firework, gondola, or flame, or there is a big sound, a panoramic image data D where those things are presented large is selected.

In a case where a spotlight is employed, the system controller 131 detects an irradiation destination of the spotlight and tracks the spotlight. The tracking of the spotlight may be performed on the basis of edge detection and motion vector detection.

If a difference of the area ratio is small between the panoramic image data D, or the idol stars are dispersed, the display image data may be displayed sequentially in a time division manner (looped) or may be changed while shifting the viewpoint coordinates at a constant speed so as to rotate the camera.

In the manual mode and the semi-manual mode, the rate may be set to be high for the panoramic image data D selected in the automatic mode. That is, the panoramic image data D to be switched in the next time is predicted in advance. For example, when the tracking target is presented large, it is determined that it is highly likely to switch, and the rate of the corresponding panoramic image data D is set to be high. Reversely, when the tracking target is presented small, or is not presented at all, the tracking target is not likely to switch. Therefore, the rate of the corresponding panoramic image data D is set to be low.

In the manual mode and the semi-manual mode, the camera set 101 corresponding to the panoramic image data D selected in the automatic mode may be displayed in a discolored or blinked state, so that the viewing user can be notified that the tracking target is presented large.

In this manner, the packet data PK is created such that the data amount is reduced for the panoramic image data D other than the panoramic image data D of the reproduction target. As a result, it is possible to remarkably reduce the communication load.

<Operations and Effects>

Feature A1: The moving picture reproducing device (reproducer 5) or the moving picture reproducing system (moving picture reproducing system 10) according to the present invention includes: a storing means (memory unit 52) configured to store a plurality of panoramic image data (panoramic image data D) photographed at an identical time by associating with predetermined time information; a reproduction control means (system controller 51) configured to perform control such that selected one of the plurality of panoramic image data is set as a reproduction target, a part of the reproduction target is clipped as a presentation image, and the presentation image is displayed on a display device (display unit 54); and a switching control means (system controller 51) configured to perform control such that, when the reproduction target is reproduced at a predetermined reproduction timing, the reproduction target is switched to another panoramic image data at the predetermined reproduction timing on the basis of the time information in response to a user's switching request.

In this Feature A1, it is possible to switch the panoramic image data photographed at an identical time to another panoramic image data freely as if the image is jumped in response to a user's switching request. Therefore, it is possible to further improve enjoyment of reproducing the panoramic image data.

Feature A2: In the invention of Feature A1, the user's switching request is executed by selecting the camera used to photograph a plurality of panoramic image data or the object on which this camera is mounted.

Note that the camera used to photograph a plurality of panoramic image data or the object on which this camera is mounted includes a camera presented in the panoramic image data in a live-action manner, an object on which the camera is mounted, or cameras presented in a camera layout diagram displayed in a subsidiary small screen or a thumbnail screen. When a diagram of the cameras which are not real is displayed as in the camera layout diagram, it is desirable that the direction of the viewpoint coordinates of the panoramic image data displayed immediately after the switching matches the direction of the camera.

According to the invention of Feature A2, it is possible to allow the viewing user to perform switching of the panoramic image data with a simple manipulation. In addition, it is possible to allow the viewing user to recognize which camera is used to photograph the image in an intuitive manner. Therefore, it is possible to make watching of the panoramic image data more joyful.

Feature A3: In the invention of Feature A1 or A2, the storing means stores the coordinate information (contour coordinates) of the camera used to photograph a plurality of panoramic image data or the object on which this camera is mounted. The switching control means recognizes that the camera used to photograph a plurality of panoramic image data or the object on which this camera is mounted is selected on the basis of the coordinate information.

According to the invention of Feature A3, the coordinate information representing the link area is provided in advance. Therefore, it is possible to reduce a processing load of the reproducer without necessity for a process of selecting the link area.

Note that, if the camera presented in a live-action manner on the panoramic image data or the object on which this camera is mounted is selected as the link area, it is also possible to allow the reproducer to directly specify this camera or object by clipping it. As a result, it is possible to facilitate the editing work.

According to the invention of Feature A3, an internal region of the shape of the camera or object is set in the link area for switching in advance. In addition, the switching between the panoramic image data is performed as the viewing user selects such an internal region. Therefore, it is possible to allow the viewing user to understand the manipulation method in an intuitive manner.

Feature A4: In the invention of any one of Features A1 to A3, the reproduction control means performs control such that a presentation image in which the camera used to photograph a plurality of panoramic image data before the switching or the object on which this camera is mounted is presented is displayed on a display device immediately after the switching.

According to the invention of Feature A4, the viewpoint that has been viewed immediately before is presented in the presentation image obtained immediately after the switching. Therefore, it is possible to allow the viewing user to easily understand a relationship between the current and previous positions and further entertain switching of the panoramic image data.

Feature A5: In the invention of any one of Features A1 to A3, the reproduction control means performs control such that the presentation image having the same viewpoint coordinates as those before the switching is displayed on the display device immediately after the switching.

According to the invention of Feature A5, for example, when there are a plurality of photographers, it is possible to allow the user to feel a difference in appearance due to a difference in position or the like in a comparative manner. Therefore, it is possible to increase how to enjoy the panoramic image data.

Feature A6: The moving picture reproducing method and the moving picture reproducing program include a storing step of storing a plurality of panoramic image data photographed at an identical time by associating with predetermined time information, a reproduction control step of setting selected one of the plurality of panoramic image data as a reproduction target, setting a clipped part of the reproduction target as a presentation image, and displaying the presentation image on a display device, and a switching control step of, when the reproduction target is reproduced at a predetermined reproduction timing, switching the reproduction target to another panoramic image data at the reproduction timing on the basis of the time information in response to a user's switching request.

According to the invention of Feature A6, a plurality of panoramic image data photographed at the same time can be switched without discomfort in synchronization with the reproduction timing. Therefore, it is possible to allow the viewing user to feel as if a human has been changed and further improve enjoyment obtained by watching the panoramic image data.

Feature B1: A moving picture transmission device (server 103) according to the invention includes an acquiring means (system controller 131) configured to acquire, from a reproducing means (reproducer 105) that reproduces selected one of a plurality of panoramic image data photographed at the same time, identification information (reproduction identification information) of the selected panoramic image data, a data creating means (packet generator 131B) configured to create transmission data such that a unit data amount of another panoramic image data becomes smaller than that of the one of the panoramic image data, and a transmitting means (external interface 133) configured to transmit the created transmission data to the reproducing means.

According to the invention of Feature B1, it is possible to reduce the data amount of the panoramic image data that are not being reproduced currently. Therefore, it is possible to reduce a decoding processing load and a communication load of the reproducer while promptly performing switching of panoramic image data in response to a request of the viewing user.

Feature B2: In the invention of Feature B1, the data creating means sets a processing rate of the other panoramic image data to be lower than that of the one of the panoramic image data.

According to the invention of Feature B2, it is possible to transmit uniform data to the reproducer that are reproducing the same panoramic image data. Therefore, it is possible to reduce the number of data types to be created and reduce a processing load of creating the data.

Note that similar effects can also be obtained by increasing a compression ratio of another panoramic image data (reducing an image quality) as well as by reducing the rate of another panoramic image data.

Feature B3: In the invention of Feature B1, the data creating means sets only a part of the other panoramic image data as the transmission data. Note that, in this case, the acquiring means acquires, from the reproducer, information regarding a presentation position of the presentation image such as viewpoint coordinates of the panoramic image data that are being reproduced currently, in addition to information representing the panoramic image data that are being reproduced, as identification information. In addition, for the other panoramic image data, only data around this presentation position of the presentation image is transmitted. For example, by dividing the panoramic image data into a plurality of pieces in advance and transmitting only the panoramic image data corresponding to the region including viewpoint coordinates and its neighboring region, it is possible to reduce the number of the data types to be created and the processing load of the data creating means.

Feature B4: A moving picture reproducing system of Feature B4 includes: the moving picture reproducing device of Feature A1; and a moving picture transmission device having an acquiring means configured to acquire identification information of the selected one of the panoramic image data from the moving picture reproducing device, a data creating means configured to create transmission data such that the unit data amount of another panoramic image data is smaller than that of the one of the panoramic image data, and a transmitting means configured to transmit the created transmission data to the reproducing means.

Feature C1: The moving picture reproducing system (moving picture reproducing system 110) according to the invention includes an acquiring means (external interface 133) configured to acquire a plurality of panoramic image data photographed at an identical time, a reproduction control means (system controller 151) configured to perform control such that selected one of the plurality of panoramic image data is set as a reproduction target, a part of the reproduction target is clipped as a presentation image, and the presentation image is displayed in a display device, a detecting means configured to detect a detection target set in advance from the plurality of panoramic image data, and a switching control means (system controller 131) configured to select one of the panoramic image data from which the detection target is detected on the basis of a predetermined priority and switch the selected one of the panoramic image data to the reproduction target.

According to the invention of Feature C1, it is possible to automatically and selectively display the panoramic image data in which the set detection image is presented. Therefore, it is possible to allow the viewing user to sufficiently enjoy a plurality of panoramic image data without any manipulation.

Note that it is desirable that the reproduction control means sets an inner side of the detection target in the panoramic image data serving as the reproduction target as the viewpoint coordinates. As a result, it is possible to display the presentation image by placing the detection target in the center of the presentation image or the vicinity of the center. Therefore, it is possible to further improve enjoyment of the viewing user.

Feature C2: In the invention of Feature C1, the detection target is an object or an event set in advance.

As a result, using the moving picture reproducing system, it is possible to detect and display a particular object or event. Therefore, it is possible to allow the user to visually recognize a desired image.

Feature C3: A moving picture reproducing device (moving picture reproducing system 10) according to the invention includes an acquiring means (external interface 53) configured to acquire a plurality of panoramic image data photographed at an identical time, a reproduction control means (system controller 51) configured to perform control such that selected one of the plurality of panoramic image data is set as a reproduction target, a part of the reproduction target is clipped as a presentation image, and the presentation image is displayed on a display device, a detecting means configured to detect a detection target set in advance from the plurality of panoramic image data, and a switching control means (system controller 51) configured to perform control such that one of the panoramic image data from which the detection target is detected is selected on the basis of a predetermined priority, and the selected one of the panoramic image data is switched to the reproduction target.

According to the invention of Feature C3, the panoramic image data where the set detection image is presented can be automatically and selectively displayed. Therefore, it is possible to allow the viewing user to sufficiently enjoy a plurality of panoramic image data without any manipulation.

Feature C4: A moving picture reproducing method and a moving picture reproducing program according to the invention include an acquiring step of acquiring a plurality of panoramic image data photographed at an identical time, a reproduction control step of setting selected one of the plurality of panoramic image data as a reproduction target, setting a clipped part of the reproduction target as a presentation image, and displaying the presentation image on a display device, a detection step of detecting a detection target set in advance from the plurality of panoramic image data, and a switching control step of selecting one of the panoramic image data from which the detection target is detected on the basis of a predetermined priority, and switching the selected one of the panoramic image data to the reproduction target.

According to the invention of Feature C4, the panoramic image data where the set detection image is presented can be automatically and selectively displayed. Therefore, it is possible to allow the viewing user to sufficiently enjoy a plurality of panoramic image data without any manipulation.

Third Embodiment

Next, a third embodiment will be described with reference to FIGS. 18 to 26. A moving picture reproducing system 210 according to the third embodiment is different from that of the first embodiment in that reference index coordinates based on a common index are set for each of the panoramic image data D photographed at an identical time. Note that, in the third embodiment, like elements are denoted by like reference numerals obtained by adding "200" to those of the first embodiment, and they will not be described repeatedly.

Figure 18:
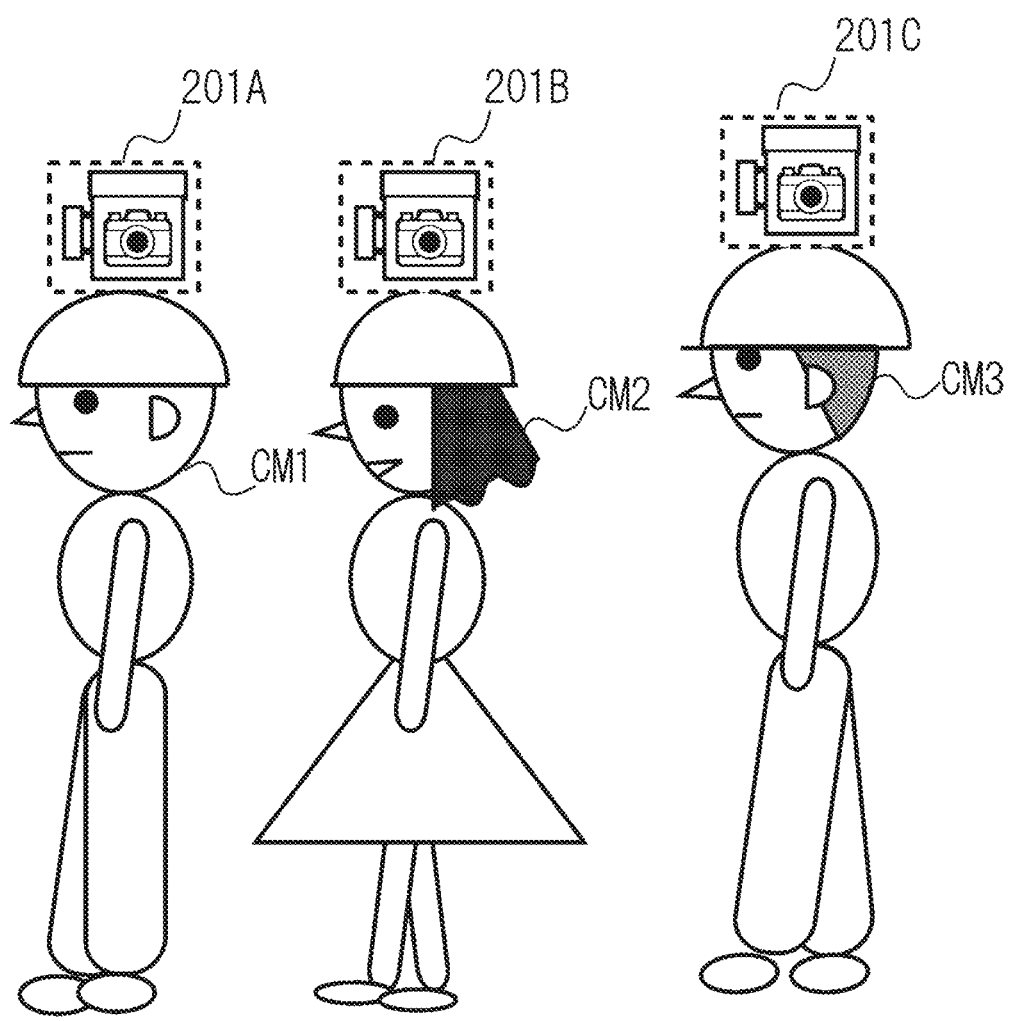
FIG. 18 is a schematic diagram for describing panoramic image data switching (1)
Figure 19:
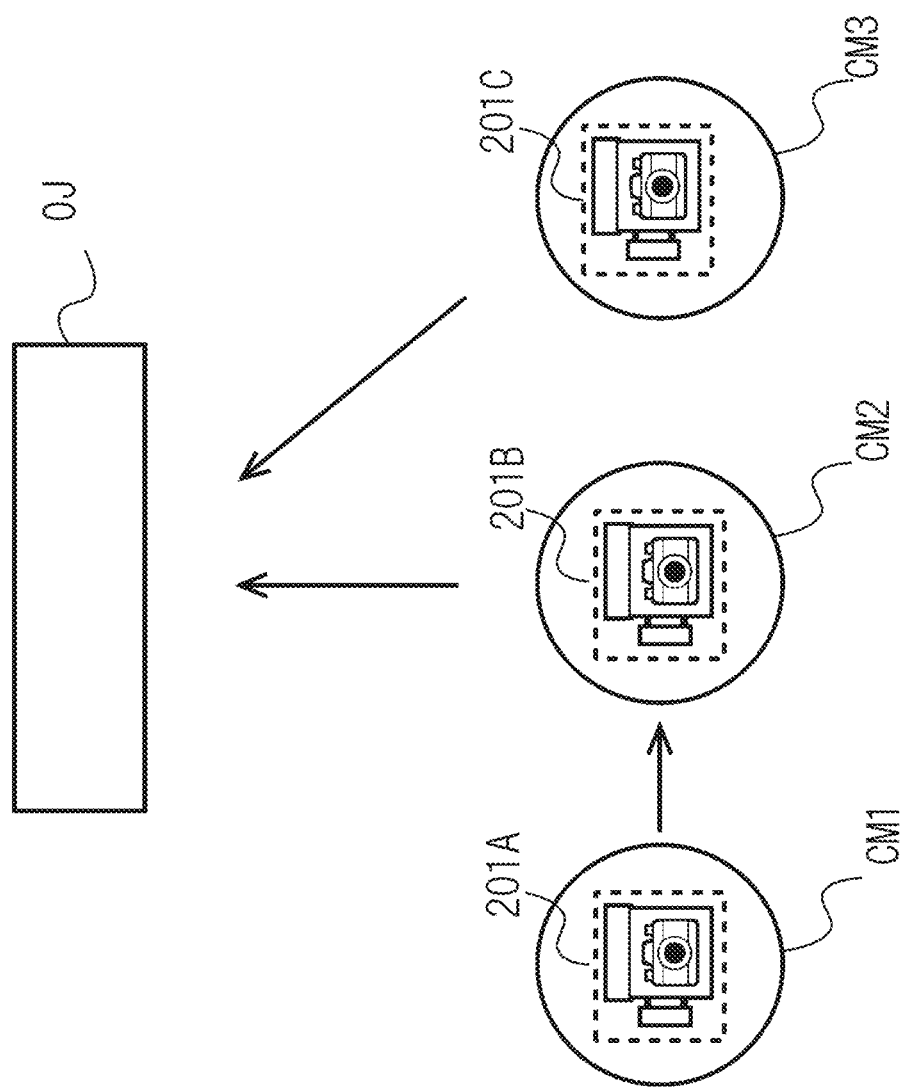
FIG. 19 is a schematic diagram for describing panoramic image data switching (2)

A case where three photographers CM1 to CM3 take photographs in an overhead manner using three camera sets 201A to 201C as illustrated in FIG. 18 will be described. As illustrated in FIG. 19, it is assumed that the photographer CM1 is looking to the photographer CM2, and the photographers CM2 and CM3 are looking at an object OJ.

It is assumed that the editing device 202 uniformly creates a panoramic image D by setting the vicinity of the line of sight that the photographer is looking as a center of coordinates (hereinafter, referred to as a panoramic center coordinate) of the panoramic image D to create panoramic moving pictures D1p to D3p. As illustrated in FIG. 19, when the photographer CM1 is looking at the photographer CM2, and the photographers CM 2 and CM 3 are looking at the object OJ, the panoramic center coordinates are scattered.

Figure 20:
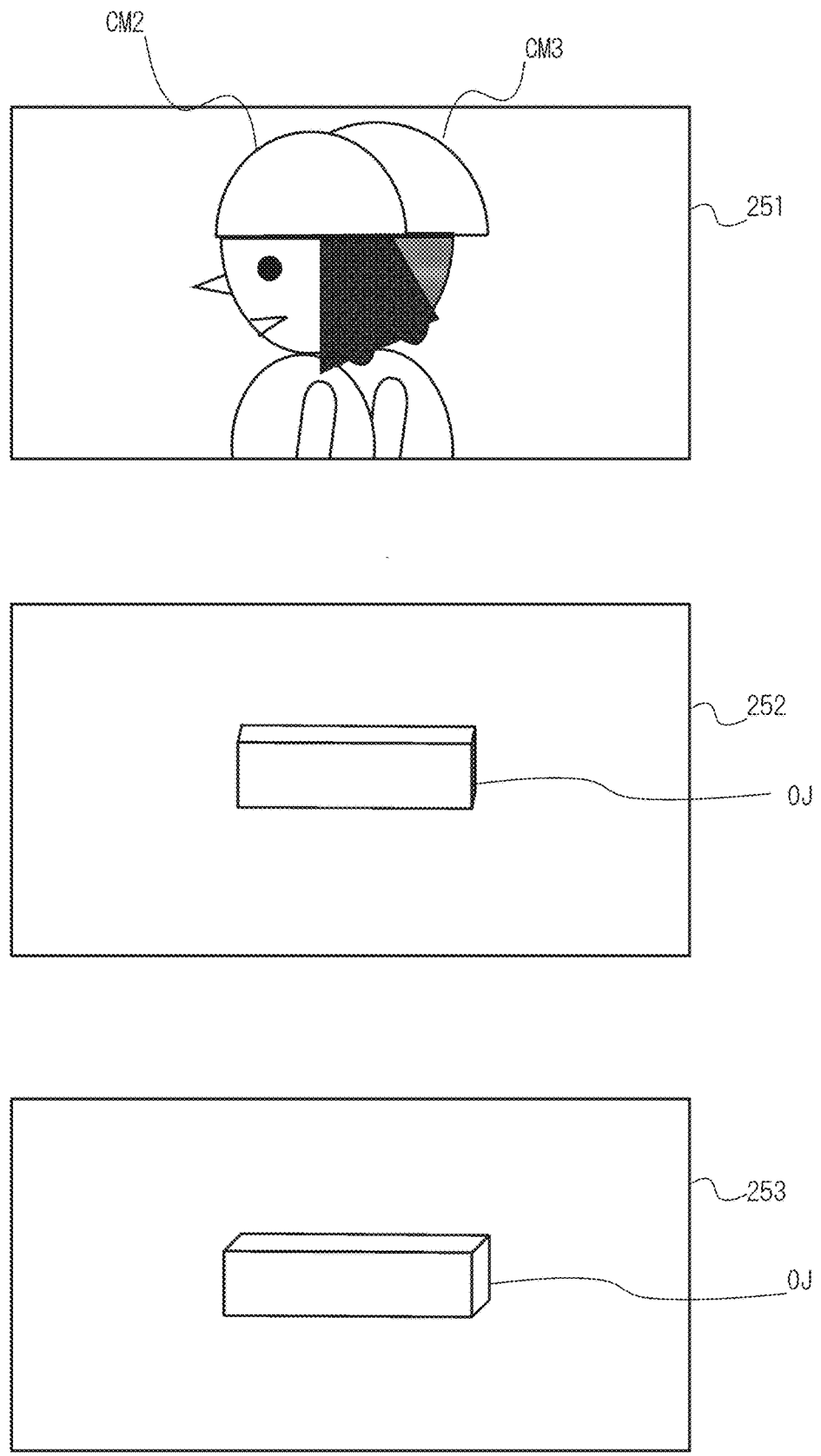
FIG. 20 is a schematic diagram for describing panoramic image data switching (3)

For example, when the viewing user is viewing the panoramic moving image D1p photographed by the photographer CM 1 by setting the panoramic center coordinates as the viewpoint coordinates as illustrated in FIG. 20, the photographers CM2 and CM3 are presented in the vicinity of the viewpoint coordinates of the presentation image 251 based on the panoramic moving picture D1p. Here, when the viewing user switches to the panoramic image D2p, the display image 252 based on the panoramic image D2p is displayed. The object OJ is presented in the vicinity of the viewpoint coordinates of the display image 252. Furthermore, when the viewing user switches to the panoramic image D3p, the presentation image 253 based on the panoramic image D3p is displayed. Nothing is presented near the viewpoint coordinates of the display image 253.

In this manner, the panoramic center coordinates of the panoramic images D1p to D3p photographed by the photographers CM1 to CM3 change depending on the viewpoints of the photographers CM1 to CM3. Therefore, if the presentation image is clipped from respective panoramic images D1p to D3p with respect to the same coordinates even when they are photographed at the same place, images indicating different directions are clipped. This may confuse the viewing user.

In this regard, according to the present invention, in order to make the viewing user to easily recognize which direction of the presentation image is directed, a common index setting process is executed for the panoramic image D such that the presentation image is clipped on the basis of a common index.

Figure 21:
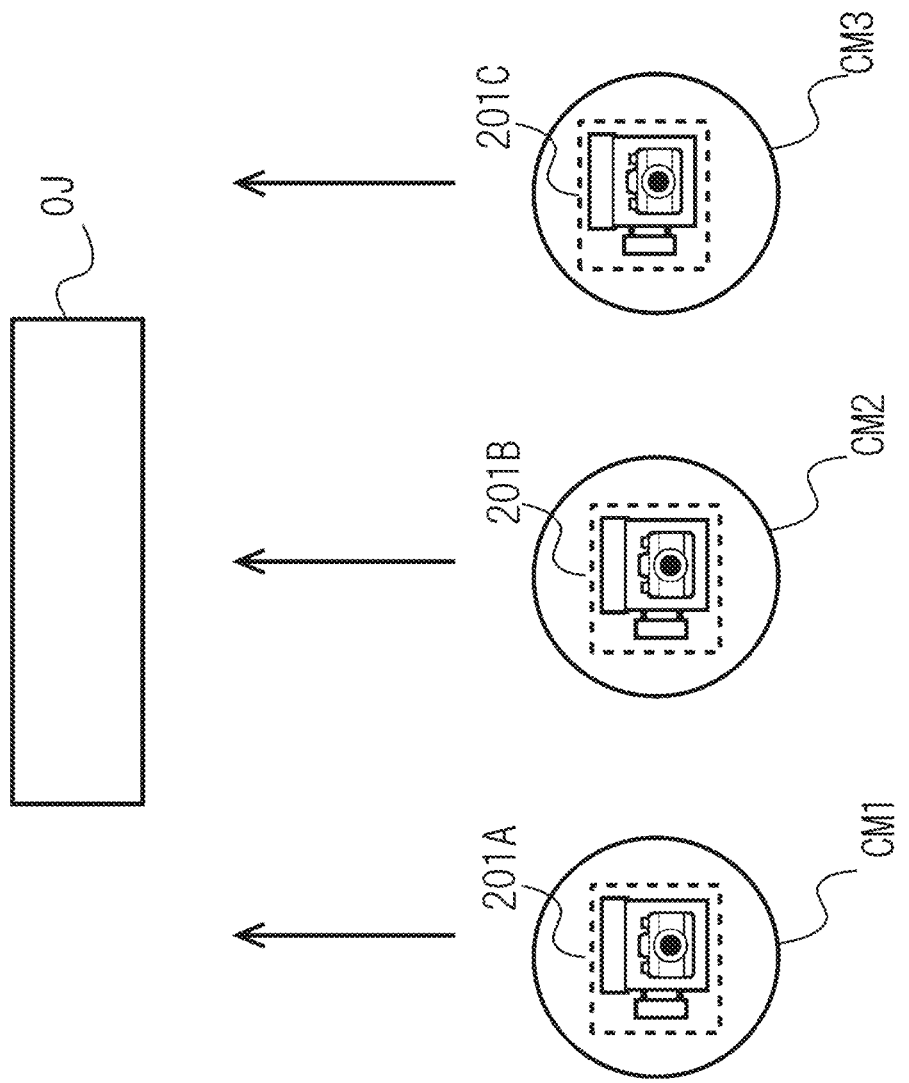
FIG. 21 is a schematic diagram for describing presentation of additional information.
Figure 23:
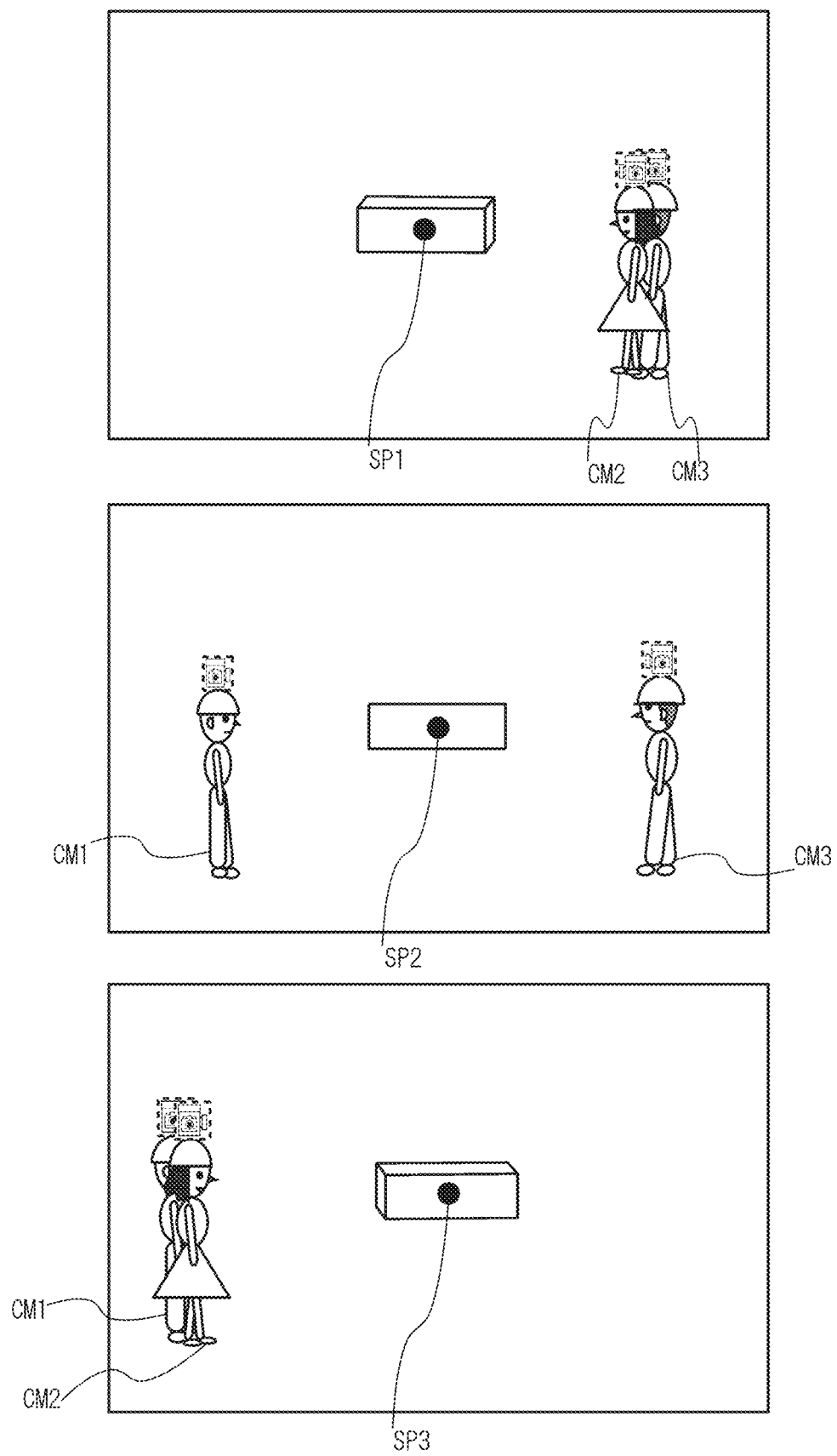
FIG. 23 is a schematic diagram for describing photography according to the second embodiment.

Specifically, in the common index setting process, the same direction is set as a common index as illustrated in FIG. 21. For the direction, for example, a direction detector such as a direction needle and a vertical (gravity) detector is installed in the camera set 201 (201A to 201C). The system controller 221 (not shown) of the editing device 202 acquires the direction information together with the single-image data and the time information, and sets the panoramic center coordinates of the panoramic image data D such that the directions become the same or substantially the same. In this case, the panoramic center coordinates are the common index coordinates.

Specifically, the image editing unit 221A of the system controller 221 recognizes a combination of the single-image data from the single-image data and the device ID, decodes the single-image data, synthesizes full-sphere image data by combining the single-image data for each camera set 201 in synchronization with the time information, and deploys the full-sphere image data with respect to the panoramic center coordinates to create the panoramic image data D. Note that these processes are executed through computation in practice.

In this case, as the common index setting process, the image editing unit 221A creates the panoramic image data D on the basis of direction information CP (CP1 to CP3) acquired for each camera set such that all of the camera sets take photographs in substantially the same direction (allowance of ±10° from the same direction to the upper, lower, left, and right).

Specifically, the image editing unit 221A creates the panoramic image data D corresponding to one camera set in advance. Note that, here, it is assumed that the panoramic image data D1 corresponding to the camera set 201A is set. The image editing unit 221A compares the direction information CP1 to CP3 corresponding to the panoramic image data D1. If there is a difference in the direction indicated by the direction information, the remaining panoramic image data D2 and D3 are created by shifting the panoramic center coordinates so as to cancel this difference.

As a result, it is possible to arrange the panoramic center coordinates in substantially the same direction for the panoramic image data D1 to D3 photographed at the same timing. Therefore, it is possible to create the panoramic image data D1 to D3 as if all of the camera sets 201A to 201C perform photography in substantially the same direction as illustrated in FIG. 21.

In this manner, if the panoramic center coordinates are set on the basis of the common index, the panoramic image data D1 to D3 are created such that their directions as the common index are substantially the same as illustrated in FIG. 22. For this reason, the reproducer 205 can create the presentation images 251 to 253 by clipping an image simply using the same viewpoint coordinates in response to a switching command from the viewing user.

As a result, as illustrated in FIG. 22, images obtained by photographing a relatively close portion are displayed as the presentation images 251 to 253. Therefore, it is possible to allow the viewing user to enjoy the difference between the panoramic image data D1 to D3.

Note that, if there are a plurality of common image regions, it is desirable that an image region having a higher human visual attraction is selected as the common image region with a higher priority. The human visual recognition level may be obtained by applying a method of automatically extracting the visual interest region from image quality called "saliency map." This method is described in the Web pages URL1 and URL2 described below in details. For example, the interest region having the higher human visual recognition is extracted, for example, depending on a luminance level, a luminance pattern, an image size, and the like.

URL1: http://www.slideshare.net/akisatokimura/ss-10694017

URL2: http://www.slideshare.net/takao-y/20150619-49592895

A common image region which is an image region obtained by photographing a common photographic target such as an object or a landscape may be set as the common index. Note that the clipping of the common image region may be performed from all of the frames or may be performed periodically (for example, once per 0.1 to 1 seconds).

Specifically, the image editing unit 221A of the system controller 221 recognizes a combination of the single-image data from the single-image data and the device ID, decodes the single-image data, combines the single-image data for each camera set 201 in synchronization with the time information to create the panoramic image data D1 to D3.

Then, the image editing unit 221 searches a photographic target such as an object or a landscape common to the panoramic image data D1 to D3 as the common image region, and stores, for example, a center of the common image region as the common index coordinates by associating the common index coordinates with the panoramic image data D1 to D3.

The method of detecting the common image region is not particularly limited, and various techniques well known in the art may be employed, such as an image region clipping and matching method based on the luminance difference or a method of tracking the common image region using a motion vector.

Figure 24:
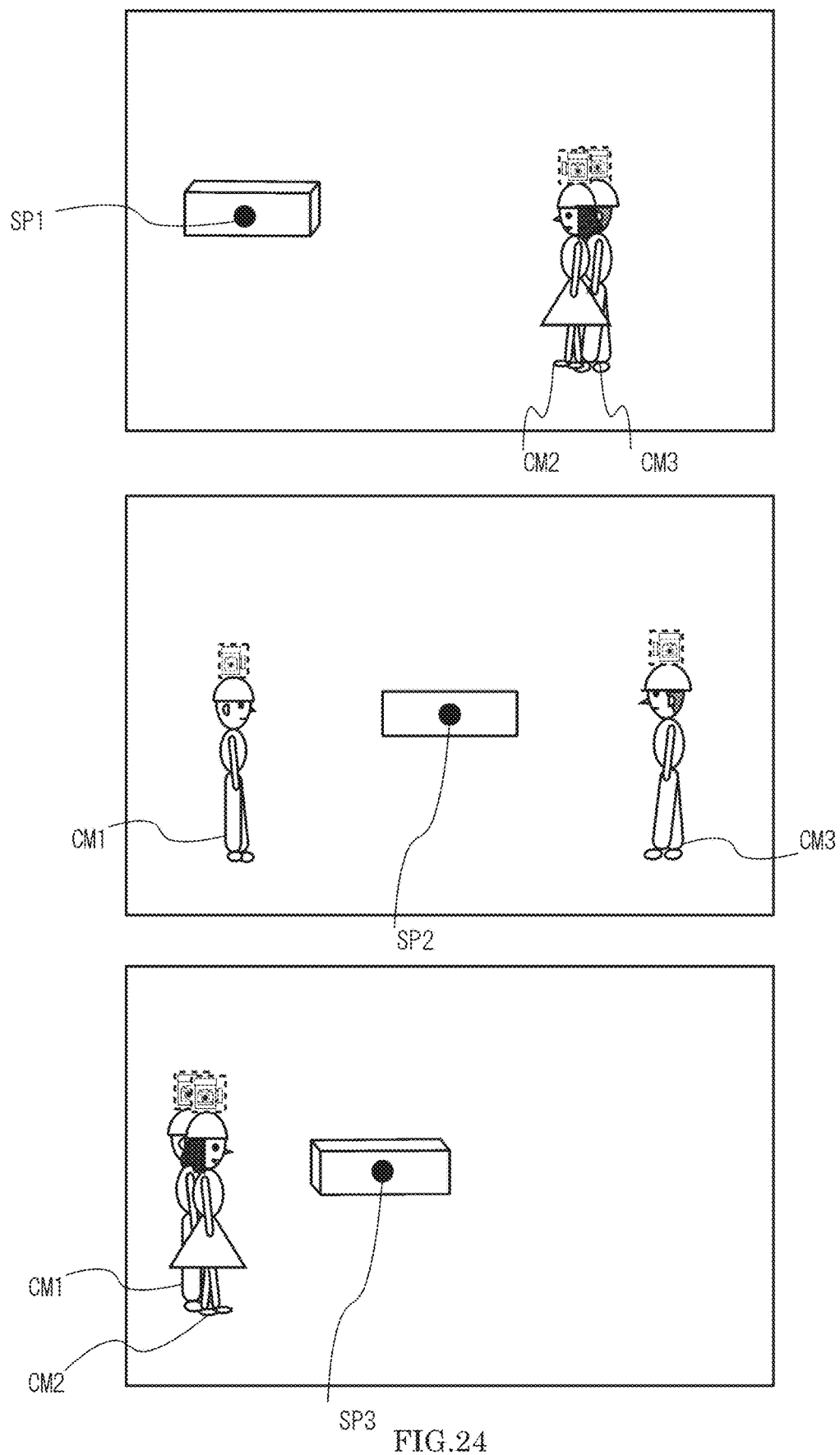
FIG. 24 is a block diagram illustrating a configuration of a server according to the second embodiment.

For example, if an object OJ is detected as the common image region, the image editing unit 221 stores a center of the object OJ as the common index coordinates by associating with the panoramic image data D1 to D3 as illustrated in FIG. 24.

The reproducer 205 may create the presentation images 261 to 263 as illustrated in FIG. 25 by determining the viewpoint coordinates by canceling the difference of the common index coordinates, and clipping the image on the basis of the common index coordinates in response to a switching command from a viewing user. Since the viewpoints close to those before the switching are displayed in the presentation images 261 to 263, it is possible to prevent confusion of the viewing user.

Figure 26:
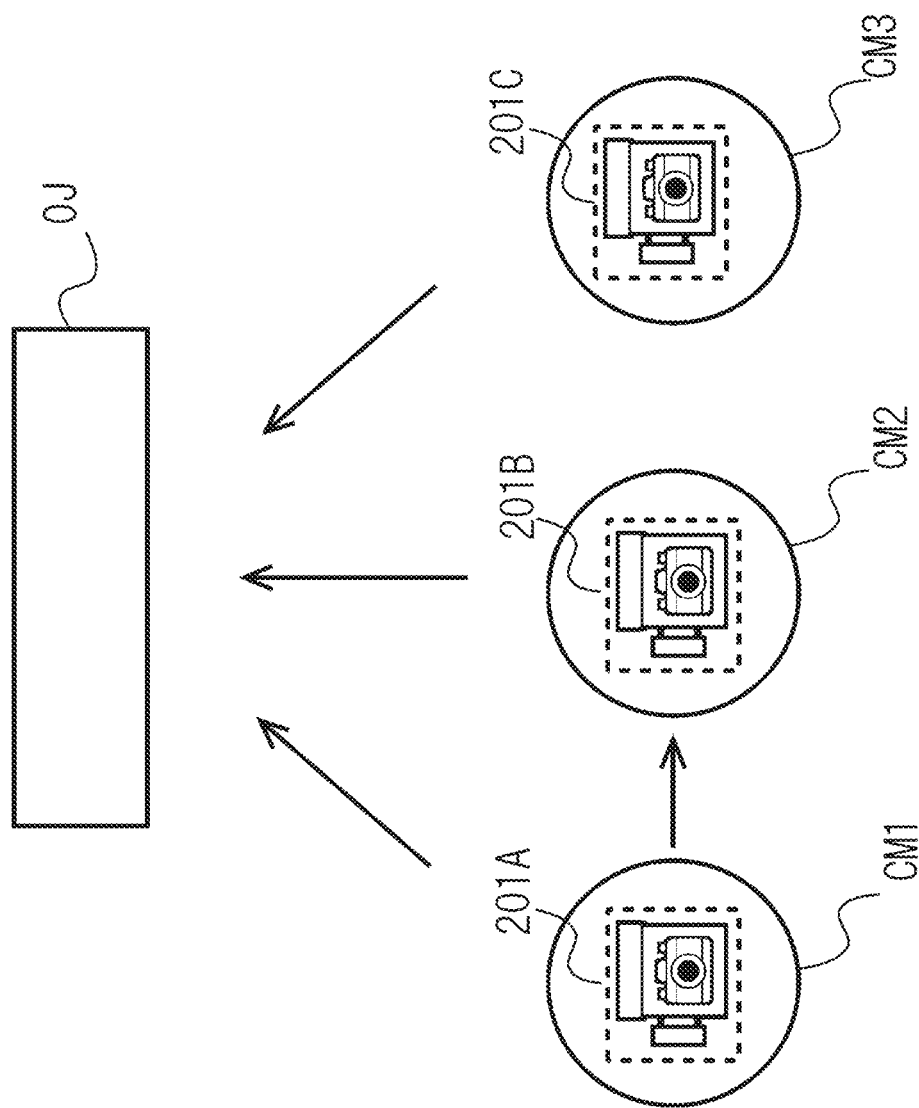
FIG. 26 is a block diagram illustrating a configuration of a reproducer according to the second embodiment.

That is, if the common image region is set as the common index, it is possible to create the panoramic image data D1 to D3 as if the photographers CM1 to CM3 photograph the same photographic target as illustrated in FIG. 26.

In this manner, the image editing device 203 executes the common index setting process for determining the viewpoint coordinates serving as a center of the presentation image on the basis of the common index. Therefore, even when the panoramic image data D serving as a basis of the presentation image switches in response to a switching command from a viewing user, it is possible to set the photographic regions of the presentation images in the same or close position. Therefore, it is possible to prevent confusion of the viewing user who don't know where is displayed because utterly different photographic regions are displayed.

Fourth Embodiment

Next, a fourth embodiment will be described. The fourth embodiment is different from the third embodiment in that fixed-point photography and stereophonic recording are performed. Note that, in the fourth embodiment, like elements are denoted by like reference numerals obtained by adding "100" to those of the third embodiment, and they will not be described repeatedly.

According to the fourth embodiment, fixed-point photography is executed in a similar way to that of the second embodiment of FIG. 13. For this reason, the common index is set in a similar way to that of the third embodiment. However, the common index setting process may be performed for at least one frame of the panoramic moving picture data D photographed continuously after the start of the photography.

As the common index, for example, a particular mark may be photographed. Alternatively, a landscape of a concert hall, a person such as a staff or an actor may be set as a photographic target. A direction may also be set.

In addition, according to the fourth embodiment, a four-channel sound recording means is provided as a part of the camera set 301. A 360° stereo microphone (for example, ambisonics microphone) that resynthesizes two-channel sound to be reproduced by a headphone by mixing four-channel sound from the information from the viewpoint direction during reproduction is employed.

As a result, it is possible to provide different sound depending on a place and a viewfield of the presentation image as the panoramic image data D is switched. Therefore, it is possible to further improve entertainment of the panoramic image by increasing presence of the viewing user.

<Operations and Effects (2)>

Hereinafter, features of a group of inventions extracted from the aforementioned embodiments will be described along with problems, effects, and the like as necessary. In the following description, in order to facilitate understanding, corresponding configurations of each embodiment are described appropriately in parentheses or the like, but they are not limited to specific configurations of parentheses or the like. In addition, the meanings or examples of the terms described in each feature may be applied as meanings or examples of terms described in other features described in the same language.

In the prior art, a panoramic image reproduction technique has been proposed, in which so-called full-sphere or half-sphere moving picture data having an viewfield angle of 360° is photographed, and a part of the moving picture data is clipped and displayed depending on a user's desire (for example, refer to Patent Document 1).

In the panoramic image reproduction technique having such a configuration, it is assumed that one of the panoramic image data is reproduced using a single camera set. If a plurality panoramic image data can be reproduced by a plurality of camera sets while switching them, it is conceived that entertainment of the panoramic image data can be improved.

Feature D1: A moving picture reproducing device (reproducer 205) or a moving picture reproducing system (moving picture reproducing system 210) according to the present invention includes a storing means (memory unit 252) configured to store a plurality of panoramic image data (panoramic image data D) photographed at an identical time by associating with predetermined time information, a reproduction control means (system controller 251) configured to set selected one of the plurality of panoramic image data as a reproduction target, set a clipped part of the reproduction target as a presentation image, and display the presentation image on a display device (display unit 54), a switching control means (system controller 251) configured to, when the reproduction target is reproduced at a predetermined reproduction timing, switch the reproduction target to another panoramic image data at the reproduction timing on the basis of the time information in response to a user's switching request, and a common index setting means (image editing unit 221A) configured to execute the common index setting process for determining the viewpoint coordinates serving as a center of the presentation image on the basis of the common index common to the plurality of panoramic image data.

According to the invention of Feature D1, the reproducer can display the presentation image determined on the basis of the common index. Therefore, even when the panoramic image data is switched, it is possible to display a portion in which the same or close place is photographed at all times. Accordingly, it is possible to simply allow the viewing user to understand a position of the presentation image.

Feature D2: The reproduction control means performs control such that the presentation image of the other panoramic image data is displayed on the display device on the basis of the common index coordinates set in the common index setting process when the reproduction target is switched to the other panoramic image data in response to a user's switching request.

According to the invention of Feature D2, a common position where the same or close place is photographed on the basis of the common index can be set as the common index coordinates. Therefore, it is possible to simply create the image where the same or close place is photographed as the presentation image using the common index coordinates.

Feature D3: In the invention of Feature D1 or D2, the common index is a direction generated on the basis of measurement information acquired during photography.

According to the invention of Feature D3, it is possible to clip regions having the same direction as the presentation image. Therefore, it is possible to prevent discomfort of the viewing user.

Feature D4: In the invention of Feature D1, the common index is a common image region obtained by photographing a photographic target such as a landscape or an object photographed commonly from the plurality of panoramic image data.

According to the invention of Feature D4, it is possible to set a region obtained by photographing the same portion as the presentation image. Therefore, it is possible to allow the viewing user to easily recognize the current viewfield position.

Feature D5: According to the invention of Feature D1, a sound output means configured to output sound is provided.

The storing means stores stereophonic sound stereophonically recorded using a microphone having two or more channels. The reproduction control means performs control such that the sound output means outputs the sound of the direction responding to the user's command. Preferably, the storing means stores stereophonic sound recorded using a microphone having four or more channels. More preferably, the reproduction control means performs control such that sound recorded using a microphone having four or more channels is output as two-channel sound corresponding to the left and right ears.

According to the invention of Feature D5, sound can be output to match a viewfield (face direction) of the viewing user in addition to a 360° panoramic image matching the viewfield of the viewing user. Therefore, it is possible to improve presence of the panoramic image.

Feature D6: There is provided a panoramic moving picture editing device configured to edit a panoramic image for displaying a presentation image on a display device with respect to the viewpoint coordinates in response to a user's request. The panoramic moving picture editing device includes a storing means configured to store a plurality of panoramic image data (panoramic image data D) photographed at an identical time, and a time information setting means configured to set time information representing a temporal relationship of the photography between the plurality of panoramic image data.

According to the invention of Feature D6, the reproducer can display a presentation image determined on the basis of the common index. Therefore, even when the panoramic image data is switched, a portion where the same or close place is photographed can be displayed at all times. Therefore, it is possible to simply allow the viewing user to understand a position of the presentation image.

Feature D7: The panoramic moving picture editing device of Feature D6 further has a common index setting means configured to execute a common index setting process for determining the viewpoint coordinates on the basis of the common index common to the plurality of panoramic image data.

According to the invention of Feature D7, a common position where the same or close place is photographed on the basis of the common index can be set as the common index coordinates. Therefore, the reproducer can simply create the image where the same or close place is photographed as the presentation image using the common index coordinates.

Feature D8: In the invention of Feature D7, the common index setting means executes the common index setting process by setting the common index coordinates based on the common index as the plurality of panoramic image data.

According to the invention of Feature D8, the same effect can be achieved just by associating the common index coordinates. Therefore, it is possible to reduce a processing load of the editing device.

Feature D9: In the invention of Feature D7, the common index is a direction, and the common index setting means executes the common index setting process by switching the plurality of panoramic image data such that the directions of the plurality of panoramic image data substantially match each other.

According to the invention of Feature D9, the common index coordinates can be set as the panoramic center coordinates. Therefore, the reproducer can display the presentation image having substantially the same viewpoint through only a clipping process using the same viewpoint coordinates between a plurality of panoramic image data.

Feature D10: In the invention of Feature D7, the common index is a common image region indicating a photographic target such as a landscape or an object. The common index setting means executes the common index setting process by switching the plurality of panoramic image data such that the position of the common image region substantially matches each other between the plurality of panoramic image data.

According to the invention of Feature D10, the same effect can be achieved just by setting the same coordinates as the viewpoint coordinates between the panoramic image data. Therefore, it is possible to reduce a processing load of the reproducer for switching the panoramic image data.

Feature D11: In the invention of Feature D8, the common index setting means sets an image region having a higher human visual recognition as the common image region with a higher priority when a plurality of common image regions are extracted.

According to the invention of Feature D11, the image region having the higher visual recognition can be set as the common image region. Therefore, by setting the common image region having the smallest positional deviation during photography as the image region having the high visual recognition, it is possible to prevent the viewing user from feeling a deviation of a shooting location.

The reproduction control means of the reproducer determines the viewpoint coordinates serving as a center of the presentation image on the basis of the common index common to the plurality of panoramic image data. The reproduction control means of the reproducer performs control such that the presentation image of the other panoramic image data is displayed on the display device on the basis of the common index coordinates set in the common index setting process when the reproduction target is switched to the other panoramic image data in response to a user's switching request.

Other Embodiments

In the second embodiment described above, a case where an idol star as a tracking target is tracked using face authentication or a motion vector has been described. Without limiting to such a case, for example, a special mark such as a necklace or a band that can be easily detected may be attached to a human body as the tracking target, and this mark may be detected. As a result, it is possible to more reliably track the tracking target.

In the first embodiment described above, a case where a radio wave timepiece is used for synchronization has been described. Without limiting to such a case, the time information may be created by performing photography along with sound or light at an identical time, incorporating synchronization information, and synchronizing the sound and the image later on the basis of this synchronization information (in the editing process). Even in this case, it is possible to obtain the same effects as those of the aforementioned embodiments.

Furthermore, in the first embodiment described above, the photographer has the camera 1 for photography. In the second embodiment, the camera is fixed, and there is no problem. However, if the camera is mounted on a person or an animal, or when photographing is performed by hand, there may be a deviation in the shooting angle. In this case, the shooting angle may be changed even when the same coordinates are switched to the viewpoint coordinates. For this reason, a gyro sensor may be mounted on the camera 1, and the center coordinates of the panoramic image D may be adjusted in advance. Specifically, for example, the camera 1A is set as an angle reference camera, and the angle change of the camera 1A is detected by the gyro sensor. The angle change in the camera 1B or 1C is also detected by the gyro sensor in this manner. The system controller 2 of the editing device 2 adjusts the center coordinates of the panoramic images Db and Dc by a difference of the angular velocity detected by the gyro sensor such that viewpoint movement of the center coordinates of the panoramic image Da matches viewpoint movement of the center coordinates of the panoramic images Db and Dc. As a result, it is possible to unify the viewpoints of the center coordinates at the time of switching of the panoramic images Da to Dc. In addition, for example, when a camera is mounted on a person in an overhead manner, the viewpoint significantly changes as the photographer turns sideways or the like. In this case, it is also possible to adjust the center coordinates of the panoramic images Da to Dc such that the one direction (the cardinal angle such as east, west north, and south) is set as the center coordinates at all times. As a result, the viewpoint of the viewing user is given the highest priority. Therefore, it is possible to use 360° photography at maximum.

In the first and second embodiments described above, a case where only the panoramic image D is photographed and is reproduced in a switchable manner has been described. Without limiting such a case, the panoramic image D may be combined with a normal image photographed by a typical photographic camera. For example, in the second embodiment, a zoom camera may be installed to dedicatedly photograph a zoom of an idol star, and the panoramic image D may be switched to a zoom image photographed using the zoom camera depending on a request of the viewing user or depending on a situation (for example, when the photographer desires). As a result, it is possible to respond to a viewing user's demand who wants to see a face of an idol star in a zoomed state.

In the aforementioned embodiments, a case where the editing program or the reproduction program is stored in a ROM, a hard disk drive, and the like in advance has been described. Without limiting to such as case, the editing program or the reproduction program may be installed in a flash memory or a hard disk drive inside a computer from an external memory medium such as a memory card. In addition, a database creation program may be acquired from the outside using a universal serial bus (USB) or via a wireless local area network (LAN) such as the Ethernet (registered trademark) IEEE 802.11a/b/g. Furthermore, the program may be delivered on a terrestrial digital television broadcast or a BS digital television broadcast.

The present invention may be applied to, for example, motion-based entertainment.

REFERENCE SIGNS LIST 1, 101: camera set
2, 102: editing device
3, 103: server
5, 105: reproducer
10, 110: moving picture reproducing system
21: system controller
22: memory unit
24: display unit
25: manipulation input unit
31, 131: system controller
31A, 131A: packet generator
32, 132: memory unit
33, 133: external interface 51, 151: system controller
52, 152: memory unit
53, 153: external interface
54, 154: display unit
55, 155: manipulation input unit

The invention claimed is:

1. A panoramic moving picture reproducing device comprising:
   an external interface configured to acquire a plurality of panoramic image data photographed at an identical time and stored by associating with predetermined time information;
   a reproduction unit of a system controller configured to set selected one of the plurality panoramic image data as a reproduction target, set a clipped part of the reproduction target as a presentation image, and display the presentation image is on a display device; and
   a switching unit of the system controller configured to, when the reproduction target is reproduced at a predetermined reproduction timing, switch the reproduction target to another panoramic image data at the reproduction timing on the basis of the time information in response to a user's switching request,
   wherein the reproduction unit of the system controller determines a viewpoint coordinate serving as a center of the presentation image from a center coordinate set on the basis of a common index common to the plurality of panoramic image data,
   wherein the reproduction unit of the system controller causes the display device to display the presentation image of the other panoramic image data on the basis of common index coordinates set in a common index setting process when the reproduction target is switched to the other panoramic image data in response to a user's switching request,
   wherein the panoramic moving picture reproducing device further comprises a memory unit configured to store coordinate information on the camera used to photograph the plurality of panoramic image data or the object on which the camera is mounted,
   wherein the switching unit of the system controller recognizes that the camera used to photograph the plurality of panoramic image data or the object on which the camera is mounted is selected on the basis of the coordinate information.

2. The panoramic moving picture reproducing device according to claim 1, wherein the reproduction unit of the system controller causes the display device to display a presentation image in which the camera used to photograph the plurality of panoramic image data or the object on which the camera is mounted is presented before the switching immediately after the switching.

3. The panoramic moving picture reproducing device according to claim 1, wherein the reproduction unit of the system controller causes the display device to display a presentation image having viewpoint coordinates identical to those before the switching immediately after the switching.

4. The panoramic moving picture reproducing device according to claim 1, further comprising:
   a tracking unit of the system controller configured to detect a detection target set in advance from the plurality of panoramic image data; and
   a switching unit of the system controller configured to select one of the panoramic image data from which the detection target is detected on the basis of a predetermined priority and switch the selected one of the panoramic image data to the reproduction target.

5. The panoramic moving picture reproducing device according to claim 4, wherein the detection target is an object or an event set in advance.

* * * * *